United States Patent
Goto et al.

(10) Patent No.: US 9,546,226 B2
(45) Date of Patent: Jan. 17, 2017

(54) CATALYST FOR LIVING RADICAL POLYMERIZATION AND POLYMERIZATION METHOD

(75) Inventors: Atsushi Goto, Kyoto (JP); Yoshinobu Tsujii, Kyoto (JP); Takeshi Fukuda, Kyoto (JP)

(73) Assignee: Kyoto University, Kyoto (JP)

( * ) Notice: Subject to any disclaimer, the term of this patent is extended or adjusted under 35 U.S.C. 154(b) by 0 days.

(21) Appl. No.: 13/388,811

(22) PCT Filed: May 10, 2010

(86) PCT No.: PCT/JP2010/003181
§ 371 (c)(1),
(2), (4) Date: Apr. 13, 2012

(87) PCT Pub. No.: WO2011/016166
PCT Pub. Date: Feb. 10, 2011

(65) Prior Publication Data
US 2012/0190795 A1 Jul. 26, 2012

(30) Foreign Application Priority Data

Aug. 6, 2009 (JP) .................................. 2009-183915

(51) Int. Cl.
*C08F 20/14* (2006.01)
*C08F 4/40* (2006.01)
(Continued)

(52) U.S. Cl.
CPC ................. *C08F 4/40* (2013.01); *C08F 12/08* (2013.01); *C08F 120/14* (2013.01); *C08F 293/005* (2013.01); *C08F 2438/00* (2013.01)

(58) Field of Classification Search
None
See application file for complete search history.

(56) References Cited

U.S. PATENT DOCUMENTS

2002/0156196 A1 10/2002 Saito et al.
2010/0298499 A1 11/2010 Goto et al.
(Continued)

FOREIGN PATENT DOCUMENTS

EP 2147936 A1 1/2010
EP 2439214 A1 4/2012
(Continued)

OTHER PUBLICATIONS

Goto et al (Polymer, 49, 5177-5185, Published on Sep. 4, 2008).*
(Continued)

*Primary Examiner* — Yun Qian
(74) *Attorney, Agent, or Firm* — Schwegman Lundberg & Woessner, P.A.

(57) ABSTRACT

Provided is a low-cost, highly active, environmentally friendly living radical polymerization catalyst which does not require a radical initiator. An organic compound having an oxidation-reduction capability is used as a catalyst. Even if a radical initiator is not used, a monomer can be subjected to a radical polymerization to obtain a polymer having narrow molecular weight distribution. The cost of the living radical polymerization can be remarkably reduced. It is made possible to prevent adverse effects of using a radical initiator. The present invention is significantly more environmentally friendly and economically excellent than conventional living radical polymerization methods, due to advantages of the catalyst such as low toxicity of the catalyst, low amount of the catalyst necessary, high solubility of the catalyst, mild reaction conditions, and no coloration/no odor (which do not require a post-treatment for a molded article), etc.

10 Claims, 7 Drawing Sheets

(51) Int. Cl.
  *C08F 293/00* (2006.01)
  *C08F 12/08* (2006.01)
  *C08F 120/14* (2006.01)

(56) References Cited

U.S. PATENT DOCUMENTS

| 2011/0124832 A1 | 5/2011 | Goto et al. |
| 2011/0275775 A1 | 11/2011 | Goto et al. |

FOREIGN PATENT DOCUMENTS

| JP | 4-198303 A | 7/1992 | |
| JP | 05-247103 * | 9/1993 | ............ C08C 19/32 |
| JP | 64-090209 A | 4/1998 | |
| JP | 11-322822 | 11/1999 | |
| JP | 2002-080523 A | 3/2002 | |
| JP | 200280523 A | 3/2002 | |
| JP | 2002-212247 A | 7/2002 | |
| JP | 2002212247 A | 7/2002 | |
| WO | WO-2008/139980 A1 | 11/2008 | |
| WO | WO-2009/136510 A1 | 11/2009 | |
| WO | WO-2010/027093 A1 | 3/2010 | |

OTHER PUBLICATIONS

Goto et al, JACS, 2007, 129, 13347-13354.*
Kwak et al (Macromolecules, 2007, 40, 1881-1885).*
Goto et al., Macromolecules, 41, 17, 6261-6264, Published on Aug. 16, 2008.*
"European Application Serial No. 10806168.0, Supplementary European Search Report mailed Mar. 11, 2013", 6 pgs.
"International Application Serial No. PCT/JP2010/003181, International Preliminary Report on Patentability dated Mar. 13, 2012", (w/ English Translation), 15 pgs.
"International Application Serial No. PCT/JP2010/003181, Written Opinion mailed Jun. 1, 2010", (w/ English Translation), 13 pgs.
Goto, A., et al., "Reversible chain transfer catalyzed polymerization (RTCP): A new class of living radical polymerization", *Polymer*, 49(24), (2008), 5177-5185.
Goto, A., et al., "Reversible Complexation Mediated Living Radical Polymerization (RCMP) Using Organic Catalysts", *Macromolecules*, 44(22). (2011). 8709-8715.
"Japanese Application Serial No. 2011-525742, Office Action mailed May 19, 2014", w/Translation of reference citation list, 4 pgs.
"International Application Serial No. PCT/JP2010/003181, International Search Report mailed Jun. 1, 2010", (w/ English Translation), 5 pgs.
"Machine Translation of JP 11-322822", 8 pgs.
"Machine Translation of JP 2002-080523A", 9 pgs.
"Machine Translation of JP 2002-212247A", 9 pgs.
European Application No. 10806168.0, Communication pursuant to Article 94(3) EPC mailed May 15, 2015, 3 pgs.

* cited by examiner

CATALYST FOR LIVING RADICAL POLYMERIZATION AND POLYMERIZATION METHOD

RELATED APPLICATIONS

This application is a nationalization under 35 U.S.C. 371 of PCT/JP2010/003181, filed May 10, 2010, and published as WO 2011/016166 A1 on Feb. 10, 2011, which claims priority to Japanese Patent Application Serial No. 2009-183915, filed Aug. 6, 2009, which applications and publication are incorporated herein by reference in their entirety.

TECHNICAL FIELD

The present invention is directed to a highly active catalyst, which is used in a living radical polymerization method, and a polymerization method using the catalyst. More specifically, the present invention uses an organic compound having an oxidation-reduction capability as a catalyst for a living radical polymerization method. The catalyst of the present invention is in particular useful in a living radical polymerization which does not use a radical initiator.

BACKGROUND ART

A radical polymerization method has been a well-known method for polymerizing vinyl monomers to obtain a vinyl polymer. Generally, a radical polymerization method has the disadvantage of the difficulty in controlling the molecular weight of the obtained vinyl polymer. Further, there is the disadvantage that the obtained vinyl polymer is a mixture of compounds having various molecular weights, and thus it is difficult to obtain a vinyl polymer having narrow molecular weight distribution. Specifically, even if the reaction is controlled, the ratio of weight-average molecular weight ($M_w$) and number-average molecular weight ($M_n$), ($M_w/M_n$), can be only reduced to about 2 to 3.

As a method for eliminating the aforementioned disadvantages, since around 1990, a living radical polymerization method has been developed. Specifically, according to the living radical polymerization method, it is possible to control the molecular weight. It is also possible to obtain a polymer having narrow molecular weight distribution. Specifically, a polymer having $M_w/M_n$ of 2 or less can easily be obtained. Therefore, this method has come into the limelight as a method for producing a polymer used in an advanced technology such as nanotechnology.

Catalysts which are currently used in living radical polymerization methods include transition metal complex-type catalysts.

For transition metal complex-type catalysts, complexes in which a ligand is coordinated to a compound having a central metal of Cu, Ni, Re, Rh, Ru, or the like have been used. Such catalysts are described in the following documents for example.

Patent Document 1 (Japanese Laid-open Publication No. 2002-249505) discloses that a complex in which Cu, Ru, Fe, Ni or the like is a central metal, is used as a catalyst.

It should be noted that Patent Document 1 describes in its claim 1 that an organic halide is used as a polymerization initiator. This description is not intended to mean that a halogenated hydrocarbon acts as a catalyst for living radical polymerization. According to the invention of Patent Document 1, a metal complex having a transition metal as the central metal is used as the catalyst for living radical polymerization. According to the invention of Patent Document 1, an organic halide is used as a dormant species that will be described later in the present specification.

Patent Document 2 (Japanese Laid-open Publication No. 11-322822) discloses that a hydrido rhenium complex is used as a catalyst.

It should be noted that Patent Document 2 describes a "catalyst for radical living polymerization comprising a combination of a hydrido rhenium complex and a halogenated hydrocarbon" in claim 1. This description is not intended to mean that a halogenated hydrocarbon acts as a catalyst for living radical polymerization. According to the invention of Patent Document 2, the hydrido rhenium complex is used as the catalyst for living radical polymerization. According to the invention of Patent Document 2, the halogenated hydrocarbon is used as a dormant species that will be described later in the present specification. The combination of the catalyst and the dormant species is described as a catalyst in Patent Document 2, and this does not describe that the halogenated hydrocarbon serves as the catalyst for living radical polymerization.

Non-Patent Document 1 (Journal of The American Chemical Society 119, 674-680(1997)) discloses that a compound in which 4,4'-di-(5-nonyl)-2,2'-bipyridine is coordinated with copper bromide, is used as a catalyst.

It should be noted that Non-Patent Document 1 describes that 1-phenylethyl bromide is used at the time of polymerization of styrene. That is, according to the invention of Patent Document 2, a copper bromide complex is used as a catalyst for living radical polymerization, and 1-phenylethyl bromide is used as a dormant species that will be described later in the present specification.

However, when such a transition metal complex catalyst is used, it is necessary to use a large amount of the catalyst. This is disadvantageous as it is not easy to completely remove the large amount of the catalyst used, from the products after the reaction. Another disadvantage is environmental problems which may occur by the disposal of the catalyst. The transition metal for the living radical polymerization method includes many toxic metals. The disposal of a large amount of such toxic metals causes environmental problems. Furthermore, there are cases where toxicities of catalysts remaining in products cause environmental problems. Due to the toxicity, it is difficult to use the transition metal catalysts for the production of food packages, material for living body, and medical material. Additionally, there is a problem associated with a high electroconductivity of the transition metal remaining in polymer, rendering the polymer conductive and hence unsuitable for use in electronic material such as resist material, organic electrochemical luminescence material, fuel cell, solar cell, lithium-ion cell. Furthermore, the transition metal-type catalysts do not dissolve in a reaction solution unless they form a complex. Therefore, it is necessary to use a ligand as an additive to form a complex. This causes problems, i.e., an increase of the cost of production and also an increase of the total weight of the catalyst used. Further, a ligand is usually expensive and requires a complicated synthesis method. Furthermore, the polymerization reaction requires a high temperature (for example, 110° C. or higher). (For example, in aforementioned Non-patent document 1, the polymerization reaction is performed at 110° C.).

It is noted that a living radical polymerization methods, which do not require a catalyst, have also been known. For example, a nitroxyl-type method and dithioester-type method have been known. However, these methods have the following disadvantages. A special protecting group must be introduced to the polymer growing chain. The protecting group is very expensive. Further, the polymerization reaction requires a high temperature (for example, 110° C. or higher). Further, the produced polymer is likely to have undesirable properties. For example, the produced polymer is likely to be colored differently from the natural color of the polymer. Further, the produced polymer is likely to have an odor.

On the other hand, Non-Patent Document 2 (Polymer Preprints 2005, 46(2), 245-246) and Patent Document 3 (Japanese Laid-open Patent Publication No. 2007-92014) disclose that compounds having Ge, Sn or the like as a central metal are used as catalysts. Patent Document 4 (International Publication WO2008/139980) discloses that compounds having nitrogen or phosphorus as a central metal are used as catalysts.

In regard to the copper complex catalyst described in Non-Patent Document 1, the cost for the catalyst required to polymerize 1 kg of a polymer sums up to approximately several thousand yen. On the other hand, in regard to a germanium catalyst, the cost is cut down to about one thousand yen. Thus, the invention of Non-Patent Document 2 markedly decreases the cost for the catalyst. However, in order to apply living radical polymerization to general-purpose resin products and the like, a further less expensive catalyst is demanded.

In general, it is known that transition metals or compounds of transition metal elements are preferable as catalysts for various chemical reactions. For example, the following is described on page 311 of "Inorganic Chemistry" by J. D. LEE (Tokyo Kagaku Dojin, $1^{st}$ edition published on Apr. 15, 1982): "Many transition metals and the compounds of the transition metals have catalytic action . . . in some cases, a transition metal may adopt various valences and form unstable intermediate compounds, while in other cases, a transition metal provides good reaction surfaces, and these serve as catalytic actions." That is, it has been widely understood by those skilled in the art that the properties characteristic to transition metals, such as the ability to form various unstable intermediate compounds, are indispensable in connection with the function of a catalyst.

Furthermore, Ge, Sn and Sb described in aforementioned Non-Patent Document 2 are not transition metals, but are elements that belong to the $4^{th}$ period or the $5^{th}$ period of the Periodic Table and have large atomic numbers and have a large number of electrons and a large number of electron orbitals. Therefore, it is surmised in regard to Ge, Sn, and Sb that the fact that these atoms have a large number of electrons and a large number of electron orbitals works advantageously in terms of their action as catalysts.

According to such a common technological knowledge in connection with various catalysts of the prior art, it is believed that the typical elements which belong to the $2^{nd}$ period and the $3^{rd}$ period of the Periodic Table, merely have a small number of electrons and a smaller number of electron orbitals, and thus it is disadvantageous to use them in a catalyst compound, and a catalytic action cannot be expected from compounds utilizing these typical elements. In particular, it was believed that compounds having carbon atoms in the center, such as organic compounds cannot be expected to have a catalytic action.

Furthermore, Non-Patent Document 3 discloses a catalyst using a phosphorus compound, but does not describe the use of an organic compound which has an oxidation-reduction capability.

Further, in conventional living radical polymerization, a radical initiator such as a peroxide and diazo compound was used, except for the cases where a transition metal complex is used as a catalyst and nitroxyl is used as a protecting group. It thus has, for example, the following defects:

(1) A radical generated from a radical initiator reacts with a monomer to cause a reaction that is not based on the mechanism of living radical polymerization. As a result, a polymer having a less molecular weight than the desired polymer is mixed in the product, and molecular weight distribution becomes wide.

(2) When block copolymerization is carried out, a homopolymer is mixed in the product. For example, in synthesizing a block copolymer having a structure in which the segment obtained by polymerizing monomer B is linked to the segment obtained by polymerizing monomer A, a reaction of a radical initiator with monomer B produces a homopolymer, and, as a result, the purity of the block copolymer is lowered.

(3) In living radical polymerization, branched polymers which are referred to as, for example, a star-type polymer, and comb-type polymer can be synthesized. When the polymerization of such a branched polymer is carried out, a radical generated from a radical initiator is reacted with a monomer to cause a reaction that is not based on the mechanism of the living radical polymerization, and consequently a linear polymer is mixed in the product.

(4) When surface polymerization is carried out, a polymer that is not bound to a surface is produced. In living radical polymerization, the polymerization of which the starting point is a surface of a solid can be carried out to give a product of which the polymer is bound to the solid surface. In such a case, a radical generated from a radical initiator is reacted with a monomer to cause a reaction that is not based on the mechanism of the living radical polymerization, and thereby a polymer that is not bound to the surface is produced, and the yield is lowered.

Accordingly, a method of performing living radical polymerization without using a radical initiator is desired. In this regard, when the aforementioned catalyst in which a transition metal is the central element is used, living radical polymerization can be performed without using a radical initiator. However, since catalysts in which a transition metal is the central element have the aforementioned defects, it was difficult to utilize it industrially. Non-Patent Document 4 describes methods of using it wherein nitroxyl is used as a protecting group. However, when nitroxyl is used as a protecting group, since there are the aforementioned defects including those defects that a protecting group is very expensive, and the like, it is also difficult to utilize it industrially.

PRIOR ART REFERENCES

Patent Document

[Patent Document 1] Japanese Laid-open Patent Publication No. 2002-249505
[Patent Document 2] Japanese Laid-open Patent Publication No. 11-322822
[Patent Document 3] Japanese Laid-open Patent Publication No. 2007-92014
[Patent Document 4] International Publication WO2008/139980

Non-Patent Document

[Non-Patent Document 1] *Journal of the American Chemical Society* 119, 674-680 (1997)

[Non-Patent Document 2] *Polymer Preprints* 2005, 46(2), 245-246, "Germanium- and Tin-Catalyzed Living Radical Polymerizations of Styrene", American Chemical Society, Division of Polymer Chemistry

[Non-Patent Document 3] *Polymer Preprints* 2007, 56(2), 2452, "A Novel Living Radical Polymerization using Germanium and Phosphorus Compound," The Society of Polymer Science, Japan, 56th Symposium on Macromolecules

[Non-Patent Document 4] Macromolecules 26, 2987-2988 (1993)

SUMMARY OF THE INVENTION

Problems to be Solved by the Invention

The present invention aims to solve the aforementioned problems. The objective of the present invention is to provide a catalyst having high activity for use in a living radical polymerization, and a method of polymerization using the catalyst.

Means for Solving the Problems

The present inventors earnestly conducted research to solve the above-mentioned problems and, have accomplished the present invention as a result. Specifically, according to the present invention, the following catalyst and polymerization methods are provided, and thereby the aforementioned problems are solved.

(1) A catalyst for a living radical polymerization method, wherein the catalyst is an organic compound which has an oxidation-reduction capability and catalyzes a reaction of a living radical polymerization based on a reversible oxidation-reduction reaction between a reduced state and oxidized state of the organic compound.

(2) The catalyst according to the above item 1, wherein the central atom, which is oxidized or reduced at the time of the reversible oxidation-reduction reaction, is selected from nitrogen, carbon, phosphorus, sulfur, or oxygen, and the central element has a positive electric charge in the oxidized state.

(3) The catalyst according to the above item 2, wherein in the central element is nitrogen.

(4) The catalyst according to the above item 3, wherein in the nitrogen is bound to three substituents.

(5) The catalyst according to any one of the above items 1 to 4, wherein in the organic compound in the reduced state, the central element, which is oxidized or reduced at the time of the reversible oxidation-reduction reaction, is not bound to any of a halogen atom or a hydrogen atom.

(6) The catalyst according to the above item 5, wherein in the organic compound in the reduced state, the central element, which is oxidized or reduced at the time of the reversible oxidation-reduction reaction, is bound to a substituted hydrocarbon group(s) or non-substituted hydrocarbon group(s), wherein, in the substituted hydrocarbon group(s), one or more hydrogen atom(s) in the hydrocarbon group(s) is replaced with a substituent selected from a hydroxyl group, an amino group, and a cyano group, or one or more ether linkage (s) or ester linkage (s) is inserted in the carbon skeleton in the hydrocarbon group(s), wherein, when there are two or more central elements in the organic compounds, each of the central elements is linked via the substituted hydrocarbon group or non-substituted hydrocarbon group.

(7) The catalyst according to the above item 6, wherein the number of carbon atoms in the substituted hydrocarbon group is 1 to 10 and the number of carbon atoms in the non-substituted hydrocarbon group is 1 to 10.

(8) The catalyst according to the above item 6 or item 7, wherein the central element is bound to a substituted or non-substituted alkyl group(s), substituted or non-substituted alkylene group(s), substituted or non-substituted alkenyl group(s), substituted or non-substituted alkenylene group(s), substituted or non-substituted aryl group(s), or substituted or non-substituted arylene group(s), wherein, when the central element is bound to a substituted alkyl group(s), in the substituted alkyl group(s) one or more hydrogen atoms in the alkyl is replaced with a substituent selected from a hydroxyl group, an amino group, and a cyano group, when the central element is bound to a substituted alkylene group(s), in the substituted alkylene group(s) one or more hydrogen atoms in the alkylene is replaced with a substituent selected from a hydroxyl group, an amino group, and a cyano group, when the central element is bound to a substituted alkenyl group(s), in the substituted alkenyl group(s) one or more hydrogen atoms in the alkenyl is replaced with a substituent selected from a hydroxyl group, an amino group, and a cyano group, when the central element is bound to a substituted alkenylene group(s), in the substituted alkenylene group(s) one or more hydrogen atoms in the alkenylene is replaced with a substituent selected from a hydroxyl group, an amino group, and a cyano group, when the central element is bound to a substituted aryl group(s), in the substituted aryl group(s) one or more hydrogen atoms in the aryl is replaced with a substituent selected from a hydroxyl group, an amino group, and a cyano group, when the central element is bound to a substituted arylene group(s), in the substituted arylene group(s) one or more hydrogen atoms in the arylene is replaced with a substituent selected from a hydroxyl group, an amino group, and a cyano group.

(9) The catalyst according to the above item 6 or 7, wherein in the organic compound in the reduced state, the central element, which is oxidized or reduced at the time of the reversible oxidation-reduction reaction, is bound to a non-substituted hydrocarbon group(s), wherein, when there are two or more central elements in the organic compounds, each of the central elements is linked via the non-substituted hydrocarbon group(s).

(10) The catalyst according to the above item 9, wherein the central element in the organic compound in the reduced state, is bound to only the non-substituted hydrocarbon group(s).

(11) The catalyst according to the above item 6, wherein the organic compound has one or two or more central elements, the central element is nitrogen, and the nitrogen atom, which is the central atom, is bound to three substituents selected from an alkyl group(s), alkylene group(s), alkenyl group(s), alkenylene group(s), alkynyl group(s), or alkynylene group(s), with the proviso that when the organic compound has one central element, the nitrogen atom, which is the central element, is bound to three substituents selected from alkyl group(s), alkenyl group(s), or alkynyl group(s), and when the organic compound has two or more central elements, each of the two or more central elements is linked via an alkylene group, alkenylene group, or alkynylene group, wherein the number of carbon atoms in the alkyl group and the alkylene group is 1 to 10, and the number of carbon atoms in the alkenyl group, alkenylene group, alkynyl group and alkynylene group is 2 to 10.

(12) The catalyst according to any one of the above items 1 to 10, which is an organic compound selected from the group consisting of:
triethylamine;
tributylamine;
tetrakisdimethylaminoethene;
1,4,8,11-tetramethyl-1,4,8,11-tetraazacyclotetradecane;
tributylphosphine;
triphenylphosphine;
bis(ethylenedithio)tetrathiafulvalene (BTTF)
ethylenediamine;
dimethylethylenediamine;
tetramethylethylenediamine;
tetramethyldiaminomethane;
tris(2-aminoethyl)amine;
tris(2-(methylamino)ethyl)amine;
1,2-bis(diphenylphosphino)methane; and hematoporphyrin.

(13) A method of polymerization comprising a step of conducting a living radical polymerization, wherein the living radical polymerization step is conducted in the presence of the catalyst according to any one of the above items 1 to 12.

(14) The method according to the above item 13, wherein a radical initiator is not added to a reaction mixture at the time of conducting the living radical polymerization.

(15) The method according to the above item 13 or 14, wherein, at the time of initiating the polymerization, as the catalyst, a mixture of the organic compound in the reduced state and a halogen molecule or a halogenated inorganic compound, which can provide a halogen to the organic compound, is used.

(16) The method according to the above item 13 or 14, wherein, at the time of initiating the polymerization, as the catalyst, a mixture of the organic compound in the reduced state and a halogen molecule is used.

(17) The method according to above item 13 or 14, wherein at the time of initiating the polymerization, as the catalyst, a mixture of the organic compound in the reduced state and the organic compound in the oxidized state is used.

(18) The method according to any one of above items 13 to 17, wherein an organic halide having a carbon-halogen bond is used in the living radical polymerization reaction, and a halogen given from the organic halide is used as a protecting group of a growing chain.

(19) The method according to above item 18, wherein two methyl groups are bound to the carbon atom to which the halogen in the organic halide is bound or one methyl group and one hydrogen are bound to the carbon atom to which the halogen in the organic halide is bound.

(20) The method according to above item 18 or 19, wherein the halogen in the organic halide is iodine or bromine.

(21) The method according to above item 18 or 19, wherein the halogen in the organic halide is iodine.

(22) A method of producing a polymer comprising a step of polymerizing a radical-polymerizable monomer in the presence of the catalyst according to any one of the above items 1 to 10.

It is noted that in a preferred embodiment, the organic halide having a carbon-halogen bond is a compound having the following general formula (II):

$$CR^2R^3R^4X^3 \qquad (II)$$

wherein $R^2$ and $R^3$ are each, independently, halogen, hydrogen, or alkyl; $R^4$ is halogen, hydrogen, alkyl, aryl, heteroaryl, or cyano; $X^3$ is halogen; and the monomer having a radical-reactive unsaturated bond is selected from:
(meth)acrylic acid ester monomers; aromatic unsaturated monomers (styrene-type monomers); carbonyl-group-containing unsaturated monomers; (meth)acrylonitriles; (meth)acrylamide-type monomers; diene-type monomers; vinyl ester monomers; N-vinyl monomers; (meth)acrylic acid monomer; vinyl halide monomers; and 1-olefin monomers.

Effect of the Invention

The present invention provides a catalyst for living radical polymerization which has high activity and a polymerization method using the same.

This catalyst has a significant advantage in that it is not necessary to use a radical initiator when a living radical polymerization is conducted.

Further, this catalyst has the advantage of having low toxicity. This catalyst has the advantage of having high solubility in a reaction solution. Therefore, it is not necessary to add a ligand to form a complex. As this catalyst has high activity, the polymerization reaction does not require a high temperature (for example, 110° C. or more). Further, the amount of the catalyst used can be reduced. Furthermore, the polymerization reaction does not require an expensive unique protecting group for protecting a polymer growing chain during a reaction. Additionally, molded products, which are obtained from the polymer obtained by the method of the present invention, have the advantage in which color or odor does not substantially occur during the molding process.

Moreover, the present invention has the following advantages.

(1) Economical Efficiency
A low-priced catalyst is provided.

(2) Safety to the Human Body and Environment.
Most organic compounds are non-toxic, and thus if they are taken into the human body, it will be harmless. Accordingly, from the viewpoint of safety, it is not necessary to remove them from a produced polymer. Even in the case of removing them for some reason, because of their characteristics including high water-solubility and the like, the operation for the removal is extremely easy.

(3) Recyclability
A variety of beads bearing an organic compound are commercially available. These can be used as a catalyst. These beads can be recovered, and can be further used many times.

(4) Effective Utilization of Natural Products
A wide variety of natural organic compounds can be utilized as catalysts.

(5) Versatility of Usable Monomers
For a variety of monomers, it is made possible to conduct a living radical polymerization. Particularly, in polymerization of a monomer having a highly-reactive functional group, an organic compound is hardly affected by the functional group of the monomer, and thus is advantageous. Similarly, it is advantageous when using a solvent having a highly-reactive functional group.

As described above, according to the present invention, a living radical polymerization method, which is significantly more environment-friendly and economically advantageous than conventional methods, has been realized.

EMBODIMENTS FOR CARRYING OUT THE INVENTION

Figure 1A:
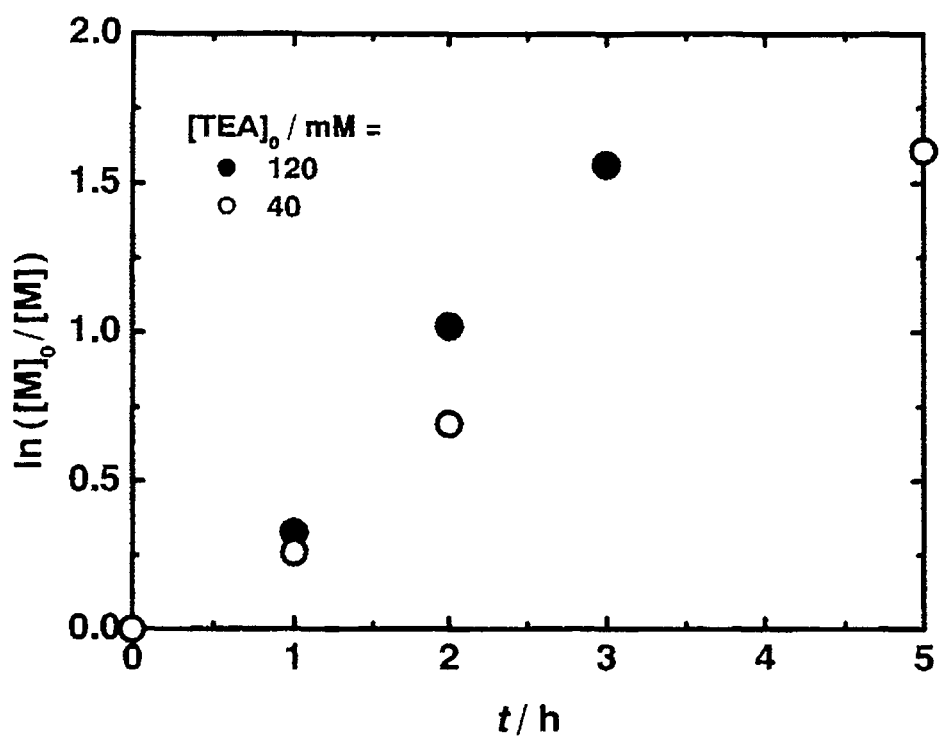
FIG. 1a shows a graph plotting $\ln([M]_0/[M])$ versus t (hour) for the result of performing at 80° C. the polymerization of methyl methacrylate (MMA) containing CP-I (80 mM), TEA (120 mM or 40 mM), and $I_2$ (1 mM). White circles represent the values of TEA 40 mM. Black circles represent the values of TEA 120 mM.

Hereinbelow, the present invention will be explained in detail.

General Terms

Hereinafter, the terms, which are particularly used in the present specification, will be explained.

In the present specification, a "hydrocarbon" refers to a molecule or group which consists of carbon and hydrogen. A chain hydrocarbon may be a straight chain or branched chain. A cyclic hydrocarbon may consist of a cyclic structure. A cyclic hydrocarbon may have a structure in which a chain hydrocarbon is linked to the cyclic structure. A hydrocarbon may have an arbitrary natural number of carbon atoms. Preferably, a hydrocarbon has 1 to 30 carbon atoms. More preferably, a hydrocarbon has 1 to 20 carbon atoms. Further preferably, a hydrocarbon has 1 to 10 carbon atoms.

When a hydrocarbon molecule or hydrocarbon group is unsaturated, the unsaturated bond may be a double bond or triple bond. The hydrocarbon molecule or hydrocarbon group may have only one unsaturated group, or may have two or more unsaturated groups.

Specific examples of the hydrocarbon include alkyl, alkenyl, alkynyl, alkoxy, aryl, and the like described below.

In the present specification, an "alkyl" refers to a monovalent group which is generated after a chain or cyclic aliphatic hydrocarbon (alkane) loses a hydrogen atom. In the cases of a chain alkyl group, the alkyl group is generally represented by $C_kH_{2k+1}$— (wherein k is a positive integer). A chain alkyl group may be a straight chain or branched chain. A cyclic alkyl group may consist of a cyclic structure. A cyclic alkyl group may have a structure in which a chain alkyl group is linked to the cyclic structure. An alkyl group may have an arbitrary natural number of carbon atoms. Preferably, an alkyl group has 1 to 30 carbon atoms. More preferably, an alkyl group has 1 to 20 carbon atoms. In the present specification, an "alkylene" refers to a divalent group which is generated after an alkyl group further loses one hydrogen atom.

In the present specification, a "lower alkyl" refers to an alkyl group having a relatively small number of carbon atoms. Preferably, a lower alkyl is a $C_{1-10}$ alkyl group. More preferably, a lower alkyl is a $C_{1-5}$ alkyl group. Further preferably, a lower alkyl is a $C_{1-3}$ alkyl group. For instance, specific examples include methyl, ethyl, propyl and isopropyl. In the present specification, a "lower alkylene" refers to a divalent group which is generated after a lower alkyl group further loses one hydrogen atom.

In the present specification, an "alkenyl" refers to a monovalent group which is generated after a chain or cyclic aliphatic hydrocarbon (alkene) having a double bond loses a hydrogen atom. In the cases of a chain alkene having one double bond, the alkene group is generally represented by $C_kH_{2k-1}$— (wherein k is a positive integer). The number of double bond may be one, alternatively, the number of double bond may be two or more. There is no particular upper limit in the number of double bonds, but the upper limit may be 10 or less, or 5 or less. Preferred is a structure in which double bonds and single bonds are alternately repeated. A chain alkenyl group may be a straight chain or branched chain. A cyclic alkenyl group may consist of a cyclic structure. A cyclic alkenyl group may have a structure in which a chain structure is linked to the cyclic structure. Furthermore, a double bond may be present on a cyclic structure moiety or chain structure moiety. An alkenyl group may have an arbitrary natural number of carbon atoms. Preferably, an alkenyl group has 1 to 30 carbon atoms. More preferably, an alkenyl group has 1 to 20 carbon atoms. In the present specification, an "alkenylene" refers to a divalent group which is generated after an alkenyl group further loses one hydrogen atom.

An alkenyl group may be an alkenyl group having a relatively small number of carbon atoms, i.e., lower alkenyl group. In this case, the number of carbon atoms is preferably $C_{2-10}$, more preferably, $C_{2-5}$, and further preferably, $C_{2-3}$. For instance, specific examples include vinyl and the like.

In a preferred embodiment, an alkenyl group is represented by the formula: $-CR^7=CR^8R^9$, $R^7$, $R^8$, and $R^9$ may be hydrogen, alkyl, or other substituents (for example, alkenyl, alkylcarboxyl, haloalkyl, alkylcarbonyl, amino, cyano, alkoxy, aryl, or alkyl-substituted aryl). When all of $R^7$, $R^8$, and $R^9$ are hydrogen, this group is a vinyl group.

In the present specification, an "alkynyl" refers to a monovalent group which is generated after a chain or cyclic aliphatic hydrocarbon (alkyne) having a triple bond loses a hydrogen atom. In the cases of a chain alkyne having one triple bond, the alkene group is generally represented by $C_kH_{2k-3}-$ (wherein k is a positive integer). The number of triple bond may be one, alternatively, the number of triple bond may be two or more. There is no particular upper limit in the number of triple bond, but the upper limit may be 10 or less, or 5 or less. Preferred is a structure in which triple bonds and single bonds are alternately repeated. A chain alkynyl group may be a straight chain or branched chain. A cyclic alkynyl group may consist of a cyclic structure. A cyclic alkynyl group may have a structure in which a chain structure is linked to the cyclic structure. Furthermore, a triple bond may be present on a cyclic or chain structure moiety. An alkynyl group may have an arbitrary natural number of carbon atoms. Preferably, an alkynyl group has 1 to 30 carbon atoms. More preferably, an alkynyl group has 1 to 20 carbon atoms. In the present specification, an "alkynylene" refers to a divalent group which is generated after an alkynyl group further loses one hydrogen atom.

An alkynyl group may be an alkynyl group having a relatively small number of carbon atoms, i.e., lower alkynyl group. In this case, the number of carbon atoms is preferably $C_{2-10}$, more preferably, $C_{2-5}$, and further preferably, $C_{2-3}$ In a preferred embodiment, an alkynyl group is represented by the formula:

$$-C\equiv CR^{10}.$$

$R^{10}$ may be hydrogen, alkyl, or other substituents (for example, alkenyl, alkylcarboxyl, haloalkyl, alkylcarbonyl, amino, cyano, alkoxy, aryl, heteroaryl, alkyl-substituted aryl or alkoxy-substituted heteroaryl).

In the present specification, an "alkoxy" refers to a group in which an oxygen atom is bound to the aforementioned alkyl group. That is, when the alkyl group is represented by R—, the alkoxy refers to a group represented by RO—. A chain alkoxy group may be a straight chain or branched chain. Cyclic alkoxy may be composed only of a cyclic structure, or may have a structure formed from a cyclic structure further linked with chain alkyl. The number of carbon atoms in the alkoxy may be any natural number. The number of carbon atoms is preferably from 1 to 30, and more preferably from 1 to 20.

In the present specification, a "lower alkoxy" refers to an alkoxy group having relatively fewer carbon atoms. The lower alkoxy is preferably $C_{1-10}$ alkoxy, more preferably $C_{1-5}$ alkoxy, and even more preferably $C_{1-3}$ alkoxy. Specific examples thereof include methoxy, ethoxy, butoxy, iso-propoxy, and the like.

In the present specification, an "alkylcarboxyl" refers to a group in which a carboxyl group is bound to the aforementioned alkyl group. That is, when the alkyl group is represented by R—, the alkylcarboxyl refers to a group represented by RCOO—. A chain alkylcarboxyl group may be a straight chain or branched chain. Acyclic alkylcarboxyl group may be composed only of a cyclic structure, or may have a structure formed from a cyclic structure further linked with chain alkyl. The number of carbon atoms in the alkylcarboxyl may be any natural number. The number of carbon atoms is preferably from 1 to 30, and more preferably from 1 to 20.

In the present specification, a "lower alkylcarboxyl" refers to an alkylcarboxyl group having relatively fewer carbon atoms. The lower alkylcarboxyl is preferably $C_{1-10}$ alkylcarboxyl, more preferably $C_{1-5}$ alkylcarboxyl, and even more preferably $C_{1-3}$ alkylcarboxyl.

In the present specification, an "alkylcarbonyl" refers to a group in which a carbonyl group is bound to the aforementioned alkyl group. That is, when the alkyl group is represented by R—, the alkylcarbonyl refers to a group represented by RCO—. A chain alkylcarbonyl group may be a straight chain or branched chain. Cyclic alkylcarbonyl may be composed only of a cyclic structure, or may have a structure formed from a cyclic structure further linked with chain alkyl. The number of carbon atoms in the alkylcarbonyl may be any natural number. The number of carbon atoms is preferably from 1 to 30, and more preferably from 1 to 20.

In the present specification, a "lower alkylcarbonyl" refers to an alkylcarbonyl group having relatively fewer carbon atoms. The lower alkylcarbonyl is preferably $C_{1-10}$ alkylcarbonyl, more preferably $C_{1-5}$ alkylcarbonyl, and even more preferably $C_{1-3}$ alkylcarbonyl.

In the present specification, a "haloalkyl" refers to a group in which a hydrogen atom of the aforementioned alkyl group is substituted with a halogen atom. A chain haloalkyl group may be a straight chain or branched chain. A cyclic haloalkyl group may be composed only of a cyclic structure, or may have a structure formed from a cyclic structure further linked with chain alkyl. The number of carbon atoms in the haloalkyl may be any natural number. The number of carbon atoms is preferably from 1 to 30, and more preferably from 1 to 20. In the haloalkyl, all of the hydrogen atoms may be substituted with halogen, or only some of the hydrogen atoms may be substituted.

In the present specification, a "lower haloalkyl" refers to a haloalkyl group having relatively fewer carbon atoms. The lower haloalkyl is preferably $C_{1-10}$ haloalkyl, more preferably $C_{1-5}$ haloalkyl, and even more preferably $C_{1-3}$ haloalkyl. Specific examples of a preferable lower haloalkyl group include a trifluoromethyl group, and the like.

In the present specification, a "substituted alkyl" refers to a group in which a hydrogen atom of an alkyl group is substituted with a substituent. Such a substituent includes aryl, heteroaryl, cyano and the like.

In the present specification, a "halogenated substituted alkyl" refers to a group in which a hydrogen of an alkyl group is substituted with a halogen, and another hydrogen of the alkyl group is substituted with another substituent. For, example, such another substituent includes an aryl group, a heteroaryl group, a cyano group and the like.

In the present specification, an "aryl" refers to a group which is generated after a hydrogen atom bound to a ring of an aromatic hydrocarbon is removed. The number of aromatic hydrocarbon ring constituting aryl may be one, alternatively, may be two or more. Preferred number of aromatic hydrocarbon ring is one to three. When there are a plurality of aromatic hydrocarbon rings in a molecule, the plurality of rings may be fused or not. Specifically, for example, an aryl includes a phenyl group, naphthyl group, anthracenyl group, biphenyl group, and the like.

In the present specification, a "heteroaryl" refers to a group in which elements constituting the ring skeleton of an aromatic ring of aryl contain a heteroatom other than carbon. Examples of heteroatoms include, specifically, oxygen, nitrogen, sulfur, and the like. The number of heteroatom in the aromatic ring is not particularly limited. The aromatic ring may contain, for example, only one heteroatom, or may contain two, three, or four or more heteroatoms.

In the present specification, a "substituted aryl" refers to a group which is generated after a substituent binds to an aryl group. In the present specification, a "substituted heteroaryl" refers to a group which is generated after a substituent binds to a heteroaryl group.

In the present specification, a "halogen" refers to a monovalent radical of an element, which belongs to the 7B group of the periodic table, such as a fluorine (F), chlorine (Cl), bromine (Br) and iodine (I). Preferred is bromine or iodine, and more preferred is iodine.

In the present specification, a "living radical polymerization" refers to a polymerization reaction, in which a chain transfer reaction does not substantially occur in a radical polymerization reaction and a termination reaction does not substantially occur in the radical polymerization reaction, and the growing chain end maintains the activity even after the monomers have exhaustively reacted. According to this polymerization reaction, after completion of a polymerization reaction, a terminal of the generated polymer maintains the polymerization activity. If a monomer is added, then it is possible to start the polymerization reaction again.

A living radical polymerization is characterized in that, for example, a polymer having an arbitrary average molecular weight can be synthesized by adjusting the ratio of concentrations of a monomer and polymerization initiator, and the generated polymer has very narrow molecular weight distribution, and can be applied to a block copolymer. It is noted that a living radical polymerization is sometimes abbreviated as "LRP".

In the present specification, a "central element" refers to an atom which is involved in an oxidation-reduction reaction and contributes mainly to a catalytic action among atoms constituting a compound that becomes a catalyst.

Hereinafter, the present invention will be explained in detail.

(Catalyst)

According to the present invention, an organic compound having an oxidation-reduction capability is used as a catalyst for a living radical polymerization method.

When an "organic compound" is mentioned in the present specification in regard to a catalyst compound, it refers to a compound in which the central element in the compound acting as a catalyst is not a metallic element. An organic compound used as a catalyst is preferably a compound in which a carbon atom is in the center, and more preferably, it refers to a compound in which a plurality of carbon atoms form the skeleton of the compound. In one preferred embodiment, an organic compound used as a catalyst has a central element selected from nitrogen, carbon, phosphorus, sulfur, or oxygen. In more preferred embodiment, in an organic compound used as a catalyst, the central atom is bound to the skeleton composed of a plurality of carbon atoms.

Organic compounds having an oxidation-reduction capability can take two states, which are reduced state and oxidized state. The organic compound in the reduced state can be oxidized to the organic compound in the oxidized state. The organic compound in the oxidized state can be reduced to the organic compound in the reduced state. Living radical polymerization is catalyzed by a reversible oxidation-reduction reaction between the reduced state and the oxidized state of the organic compound.

In this regard, the central atom that is oxidized at the time of oxidation from the reduced state to the oxidized state in this organic compound and is reduced at the time of reduction from the oxidized state to the reduced state, may be any element. However, it is preferably selected from nitrogen, phosphorus, sulfur, or oxygen, and is more preferably nitrogen. Examples of specific compounds thereof include trialkylamine and the like.

For example, a compound using phosphorus as the central element is preferably usable in polymerization of acrylates, styrene, or the like in particular.

In the catalyst of the present invention, preferably, a halogen atom is not bound to the central atom that is oxidized or reduced in a reversible oxidation-reduction reaction. In the catalyst of the present invention, more preferably, bromine or iodine is not bound to the central atom that is oxidized or reduced in a reversible oxidation-reduction reaction. Further preferably, in the catalyst of the present invention, iodine is not bound to the central atom that is oxidized or reduced in a reversible oxidation-reduction reaction.

Additionally, in the catalyst of the present invention, preferably, a hydrogen atom is not bound to the central atom that is oxidized or reduced in a reversible oxidation-reduction reaction.

In preferred embodiments, in the organic compound in the reduced state, a saturated aliphatic group, unsaturated aliphatic group, or aromatic hydrocarbon group is bound to the central atom that is oxidized or reduced in the reversible oxidation-reduction reaction.

The catalyst organic compound may have only one central element. The catalyst organic compound may have two or more central elements. Preferably, the catalyst organic compound has 1 to 10 central elements. More preferably, the catalyst organic compound has 1 to 6 central elements. Particularly preferably, the catalyst organic compound has 1 to 4 central elements.

When there is only one central element, preferably, a catalyst compound is a compound of which the one central element is bound to a hydrocarbon(s). Specific examples of preferable compounds are, for example, compounds represented by a general formula $AR_n$, wherein A is a central element, and in a preferable embodiment, A is nitrogen or phosphorous. R is a hydrocarbon substituent, and in a preferable embodiment, R is alkyl, aryl or the like. Compounds wherein R is lower alkyl are generally inexpensive and therefore the compounds are preferable. The number n is a number which is selected such that the valences of A and R are balanced in the whole molecule.

When two or more central elements are present, it is preferable that each of the central elements is linked via a hydrocarbon group.

Further, when there are two or more central elements, compounds having a structure wherein a halogen atom is inserted between the two central atoms are preferable. For example, a structure wherein two atoms of the central elements are coordinately bound to a halogen is preferable. Specifically, when a compound having two nitrogen atoms bound to a hydrocarbon or a compound having two phosphorus atoms bound to a hydrocarbon is used, it is possible that the compound can have such a structure that the halogen is inserted between the two nitrogen atoms or the two phosphorus atoms, and it is possible to achieve high catalytic activity.

Specific examples of preferable compounds include, for example, compounds having a structure of basic skeleton represented by general formula $A^1R^1A^2$, wherein $A^1$ and $A^2$ are central elements, and in a preferable embodiment, $A^1$ and $A^2$ are nitrogen or phosphorus. R is a hydrocarbon substituent, and in a preferable embodiment, R is alkylene, alkenylene, arylene or the like. When R is lower alkylene, generally, the compounds are inexpensive and therefore the compounds are preferable. Specific examples of compounds having such a basic structure include, for example, compounds having a structure represented by general formula $(R^2)_n A^1 R^1 A^2 (R^3)_m$, wherein $R^2$ and $R^3$ are groups which do not affect the oxidation-reduction capability of the basic skeleton structure, and in a preferable embodiment, $R^2$ and $R^3$ are hydrocarbon, and more preferably, $R^2$ and $R^3$ are alkyl, alkenyl, aryl or the like. The numbers n and m are numbers which are selected such that the valences of $A^1$, $A^2$, $R^2$, and $R^3$ are balanced in the whole molecule.

The number of carbon atoms of an organic compound of the catalyst, as a whole compound, is preferably 3 or more, and more preferably 6 or more. In addition, it is preferably 100 or less, and more preferably 20 or less.

The molecular weight of an organic compound of the catalyst is preferably 30 or more, and more preferably 50 or more. In addition, it is preferably 500 or less, more preferably 300 or less, further preferably 200 or less, much preferably 150 or less, and particularly preferably 100 or less.

According to the present invention, the catalyst can be used in combination with an organic halide having a carbon-halogen bond, which is used as a kind of dormant species. The catalyst abstracts the halogen from this organic halide at the time of the living radical polymerization, and generates a radical. Therefore, according to the present invention, the catalyst detaches a group of the compound used as a dormant species, which suppresses a growing reaction, and converts the compound into an active species, thereby controlling the growing reaction. It should be noted that the dormant species is not limited to organic halides.

It is noted that Patent Document 2 describes in its claim 1 that a combination of a hydrido rhenium complex and a halogenated hydrocarbon is a catalyst for radical living polymerization. However, since the halogenated hydrocarbon described in Patent Document 2 is not a catalyst for living radical polymerization but corresponds to a dormant species, the halogenated hydrocarbon described in Patent Document 2 is distinguished from catalysts.

The catalyst compound has at least one central element. In one preferred embodiment, the catalyst compound has one central element. However, a catalyst compound may have two or more central elements.

Many organic compounds do not have electroconductivity. Thus, for example, when a polymer is used for an application where it is not desirable that a conductive material remains in the polymer (for example, electronic material such as materials for resistor, organic electroluminescence material, or battery), it is preferable to use an organic compound as a catalyst.

Further, many organic compounds are generally also advantageous in terms of toxicity to the human body and influence to the environment. Therefore, even if a polymer is used in an application where some conductive materials are permitted to remain, it is much more advantageous to use a catalyst consisting of an organic compound than a transition metal complex catalyst or the like, which is used in prior art.

Furthermore, the catalyst of the present invention has the characteristic that a small amount of the catalyst can exert its catalytic action. Therefore, as described above, it was made possible that material having little toxicity to the human body and little influence to the environment is used in a small amount. The catalyst of the present invention is much superior to a conventional catalyst.

(Groups in the Catalyst)

If necessary, the compound of the catalyst may have various groups. For example, it is possible that an arbitrary organic group or inorganic group is bound to the central element.

Such a group may be an organic group or an inorganic group. An organic group includes an aryl group, heteroaryl group, substituted aryl group, substituted heteroaryl group, alkyl group, alkenyl group (e.g., vinyl group), alkynyl group, alkoxy group (such as methoxy group, ethoxy group, propoxy group, butoxy group, and the like), substituted amino group (dimethylamino group, diethylamino group, diphenylamino group, and the like), ester group (aliphatic carboxylic acid ester and the like), alkylcarbonyl group (methylcarbonyl group and the like), haloalkyl group (trifluoromethyl group and the like) and the like. In one preferred embodiment, an organic group is an aryl, heteroaryl group, substituted aryl group, substituted heteroaryl group, alkenyl group (e.g., vinyl group), or alkynyl group.

Further, the inorganic group includes a hydroxyl group, amino group, cyano group, and the like. The amino group may be substituted if necessary. It is noted that although an amino group is an inorganic group, when the amino group is substituted with an organic group, such a substituted amino group is classified into an organic group for convenience in the present specification.

It is also possible to use an organic compound having an organic group of conjugated system, such as aryl, heteroaryl, substituted aryl, or substituted heteroaryl. Alternatively, it is also possible to form a catalyst compound having a conjugated system by using organic groups having an unsaturated bond (such as alkenyl group, alkynyl group, or the like) in combination. However, a catalyst compound having an organic group of non-conjugated system (e.g., alkyl group) has a tendency to have higher radical activity, and it is therefore more preferable.

In a substituted aryl or substituted heteroaryl group, substituents bound to the aryl or the heteroaryl group include, for example, an alkyl group, alkyloxy group, cyano group, amino group, and the like. The alkyl group is preferably a lower alkyl group, more preferably, a $C_1$ to $C_5$ alkyl group. The alkyl is further preferably a $C_1$ to $C_3$ alkyl group, and particularly preferably a methyl group. The alkyl group in the alkyloxy group is preferably a lower alkyl group, more preferably a $C_1$ to $C_5$ alkyl group, further preferably a $C_1$ to $C_3$ alkyl group, and particularly preferably a methyl group. Thus, in one embodiment, an organic group bound to the central element is a phenyl group, lower alkyl phenyl group, or lower alkyloxy phenyl group.

There is no particular limitation for the number of the aforementioned organic groups and inorganic groups. However, the number of the aforementioned organic groups or inorganic groups is preferably three or less, and more preferably one.

It is noted that there is no particular limitation for the number of the substituents in the substituted aryl or substituted heteroaryl group. However, the number of the substituents in the substituted aryl or substituted heteroaryl group is preferably 1 to 3, more preferably 1 to 2, and further preferably 1.

Regarding the position of the substituent in the substituted aryl or substituted heteroaryl, an arbitrary position may be selected. When the aryl group is a phenyl group (that is, when the substituted aryl group is a substituted phenyl group), the position of the substituent may be ortho, meta, or para with respect to the central element. Preferably, the position is at para.

(Specific Examples of the Catalyst Compounds)

Preferred specific examples of the catalyst compounds include, for example, compounds having nitrogen as the central element, such as trialkylamine (e.g., triethylamine and tributylamine), tetrakis(dimethylamino)ethene (TDAE), 1,4,8,11-tetramethyl-1,4,8,11-tetraazacyclotetradecane (TDME), tributylphosphine, and the like. In recent years, organic compounds having hole-transporting capability are actively studied. Such organic compounds are usable. Also, phthalic imides, pyridines, bipyridines, N,N,N',N'',N''-pentamethyldiethylenetriamine (PMDETA), ethylenediamine, dimethylethylenediamine, tetramethylethylenediamine, tetramethyldiaminomethane, tris(2-aminoethyl)amine, tris(2-(methylamino)ethyl)amine, hematoporphyrin, and derivatives thereof are usable.

Compounds having phosphorus as the central element include trialkylphosphine (triethylphosphine ($Et_3P$) and the like), triarylphosphine (triphenylphosphine ($Ph_3P$) and the like), phosphonic acid (($OH)_3P$), 1,2-bis(diphenylphosphino)methane, and derivatives thereof, and the like.

Compounds having sulfur as the central element include thiophene, oligothiophene, polythiophene, tetrathiofulvalene (TTF), bis(ethylenedithio)tetrathiafulvalene (BTTF), 3,4-ethylenedioxythiophene (EDOT), poly(3,4-ethylenedioxythiophene) (PEDOT), and derivatives thereof, and the like.

Compounds having oxygen as the central element include furan, oligofuran, polyfuran, and derivatives thereof, and the like.

Compounds having carbon as the central element include ethylene, acetylene, oligoacetylene, polyacetylene, fullerene, carbon nanotubes, and derivative thereof, and the like.

Such organic compounds capable of acting as a catalyst can be readily confirmed by performing an experiment of a radical reaction. Specifically, when an organic compound and a representative dormant species (e.g., CP-I or PE-I) are combined and an experiment of living radical polymerization reaction is performed without using a radical initiator, if narrow molecular weight distribution is obtained, it is confirmed that the organic compound acts as a catalyst.

In one embodiment, a catalyst compound does not have a radical-reactive double bond.

(Manufacturing Method of the Catalyst)

Regarding compounds used as the catalyst of the present invention, many of them are known compounds, and those compounds commercially available from reagent sales companies and the like are usable as it is, or they can be synthesized using known methods. Compounds existing in natural products can be obtained using a method of extracting them from the natural products or the like.

For example, when a compound in which a hydrocarbon group (e.g., alkyl, alkoxy, aryl, heteroaryl, substituted aryl, or substituted heteroaryl) is bound to nitrogen is used as a catalyst, a commercially available compound is usable as such a compound. Alternatively, such a compound can be synthesized using a known method.

For example, when a compound in which a hydrocarbon group (e.g., alkyl, alkoxy, aryl, heteroaryl, substituted aryl, or substituted heteroaryl) is bound to phosphorus is used as a catalyst, a commercially available compound is usable as such a compound. Alternatively, such a compound can be synthesized using a known method.

For example, when an organic compound having oxygen wherein an oxidation-reduction reaction is performed at the oxygen atom is used as a catalyst, a commercially available compound is usable as such a compound. Alternatively, such a compound can be synthesized using a known method.

For example, when an organic compound having sulfur wherein an oxidation-reduction reaction is performed at the sulfur atom is used as a catalyst, a commercially available compound is usable as such a compound. Alternatively, such a compound can be synthesized using a known method.

(Amount of the Catalyst Used)

The catalyst of the present invention has very high activity and can catalyze a living radical polymerization in a small amount.

In the method of the present invention, a compound used as a catalyst may be in some cases a liquid compound that can be used as a solvent in theory. However, under the circumstance that such a compound is used as a catalyst, there is no need to use the compound in such a large amount so as to achieve an effect as a solvent. Therefore, the amount of a catalyst used can be limited to an amount smaller than the so-called "solvent amount" (that is, an amount needed to achieve an effect as a solvent). According to the method of the present invention, a catalyst may be used in an amount that is sufficient to catalyze a living radical polymerization, as described above, and there is no need to add more than that.

Specifically, for example, in a preferred embodiment, it is possible that the catalyst in an amount of 10 millimoles (mM) or less is used to one liter of reaction solution. In a further preferred embodiment, it is possible that the catalyst in an amount of 5 millimoles (mM) or less is used to one liter of reaction solution. It is also possible that the catalyst in an amount of 2 millimoles (mM) or less is used to one liter of reaction solution. Further, it is possible that the catalyst in an amount of 1 millimole (mM) or less is used to one liter of reaction solution. It is also possible that the catalyst in an amount of 0.5 millimoles (mM) or less is used to one liter of reaction solution. Regarding the weight of the catalyst, the amount of the used catalyst can be 1% by weight or less in a reaction solution. In a preferred embodiment, it is possible to limit the amount to 0.75% by weight or less, and it is also possible to limit the amount to 0.70% by weight or less. In a more preferred embodiment, it is possible to limit the amount to 0.5% by weight or less, and is also possible to limit the amount to 0.2% by weight or less. It is further possible to limit the amount to 0.1% by weight or less, and is possible to limit the amount to 0.05% by weight or less. For example, in the case of a phosphorus catalyst, the amount can be limited to 0.75% by weight or less, and can be also limited to 0.70% by weight or less. In an even more preferred embodiment, the amount can be limited to 0.5% by weight or less, can be limited to 0.2% by weight or less, can be further limited to 0.1% by weight or less, and can be also limited to 0.05% by weight or less. In other words, the amount can be limited to a "remarkably" smaller amount than an amount needed to achieve the effect as a solvent.

Further, the amount of the catalyst used is preferably 0.02 millimoles or more to one liter of a reaction solution. More preferably, the amount is 0.1 millimoles or more to one liter of a reaction solution. Further preferably, the amount is 0.5 millimoles or more to one liter of a reaction solution. Regarding the weight of the catalyst, preferably, an amount of the catalyst used is 0.001% by weight or more in a reaction solution. More preferably, the amount is 0.005% by weight or more in a reaction solution. Further preferably, the amount is 0.02% by weight or more in a reaction solution. If the amount of the catalyst used is too small, then the molecular weight distribution is likely to be broad.

According to one embodiment, in the method of living radical polymerization of the present invention, it is possible to carry out the living radical polymerization satisfactorily, even without using a catalyst for living radical polymerization or a catalyst precursor compound other than the catalyst consisting of an organic compound having an oxidation-reduction capability (hereinafter referred to as "other type catalyst or other type catalyst precursor compound") in combination. However, if necessary, it is also possible to use an other-type catalyst or an other-type catalyst precursor compound in combination. In that case, it is preferable to use a larger amount of the catalyst or the catalyst precursor compound that has a carbon atom as the central element, and to use a smaller amount of the other-type catalyst or the other-type catalyst precursor compound, in order to make the best possible use of the advantages of the catalyst or the catalyst precursor compound that has a carbon atom as the central element. Under such circumstances, the amount of the other-type catalyst or the other-type catalyst precursor compound used can be limited to 100 parts by weight or less per 100 parts by weight of the catalyst or the catalyst precursor compound that has a carbon atom as the central element. The amount can be limited to 50 parts by weight or less, can be limited to 20 parts by weight or less, 10 parts by weight or less, 5 parts by weight or less, 2 parts by weight or less, 1 part by weight or less, 0.5 parts by weight or less, 0.2 parts by weight or less, or 0.1 parts by weight or less relative to 100 parts by weight of the catalyst or the catalyst precursor compound that has a carbon atom as the central element. That is, a living radical reaction can be carried out in a reaction solution that does not substantially contain a catalyst other than the catalyst having a carbon atom as a central element.

(Protecting Group)

The method of the present invention uses a protecting group for protecting a growing chain during the living radical polymerization reaction. Regarding the protecting group, various known protecting groups, which are conventionally used as protecting groups in a living radical polymerization, can be used. In this regard, it is preferable to use halogen as a protecting group. As described above regarding prior art, when a special protecting group is used, there are disadvantages such as the disadvantage in that the protecting group is very expensive.

(Organic Halide (Low Molecular Weight Dormant Species))

According to the method of the present invention, preferably, an organic halide, which has a carbon-halogen bond, is added to the reaction material. Halogen, which is provided to the growing chain by the organic halide, is used as a protecting group. Such organic halides are relatively inexpensive. Therefore, it is more advantageous than other known compounds which are used as protecting groups in a living radical polymerization. Further, if necessary, low molecular weight dormant species in which a halogen is bound to an element other than carbon can be used.

An organic halide used as a dormant species is a compound having at least one carbon-halogen bond in the molecule which acts as a dormant species. There is no other particular limitation. However, generally, the organic halides preferably have one or two halogen atoms in the molecule.

Here, with regard to an organic halide used as a dormant species, it is preferable that when a carbon radical is generated by elimination of a halogen, the carbon radical is unstable. Thus, regarding an organic halide to be used as a dormant species, the organic halide, in which a carbon atom that would become a carbon radical is bound to two or more substituents that stabilize the carbon radical when the carbon radical is generated by elimination of a halogen, is not suitable. However, in many cases, the organic halide, in which a carbon atom that would become a carbon radical is bound to one substituent that stabilizes the carbon radical, exhibits appropriate radical stability, and can be used as dormant species.

That is to say, in the living radical polymerization method of the present invention, it is preferable to combine a catalyst compound in which the carbon radical is rendered stable, and a dormant species in which the carbon radical is not rendered too stable but is rendered appropriately stable. Due to such a combination, a living radical polymerization reaction can be performed in high efficiency. For example, a compound in which a carbon atom that would become a carbon radical is bound to two or more substituents that stabilize the carbon radical, is used as a catalyst; a compound in which the carbon atom that would become the carbon radical is bound to one substituent that stabilizes the carbon radical, is used as a dormant species; and thereby, due to the combination of the catalyst and the dormant species, high reactivity is exhibited in the living radical polymerization.

The number of hydrogen atoms carried by the carbon to which the halogen atom of the organic halide used as a dormant species is bound (hereinafter referred to as "the 1-position carbon of the organic halide" for convenience), is preferably two or less, and more preferably one or less, and it is even more preferable that the carbon does not have any hydrogen atom. Further, the number of halogen atoms bound to the 1-position carbon of the organic halide is preferably three or less, more preferably two or less, and even more preferably one. Particularly, when the halogen atom bound to the 1-position carbon of the organic halide is chlorine atom, the number of the chlorine atoms is very preferably three or less, more preferably two or less, and particularly preferably one.

It is preferable that one or more carbon atoms are bound to the 1-position carbon of the organic halide used as a dormant species, and it is particularly preferable that two or three carbon atoms are bound thereto.

A halogen atom of an organic halide used as a dormant species is preferably chlorine, bromine, or iodine, and more preferably bromine or iodine. From the viewpoint of making molecular weight distribution narrow, most preferred is iodine. In one embodiment, bromine is also preferably usable. Regarding a bromine compound, generally, it is mentioned as advantages that since it is more stable than an iodine compound, it is easy to store lower molecular weight dormant species, and that there is relatively low necessity to remove terminal halogens from a produced polymer. Moreover, regarding a compound having a plurality of bromine, many of them are commercially available or can be easily synthesized, and various branched polymers including star-type, comb-type, and surface-grafted-type polymers and the like can be easily synthesized. There is also an advantage that a block copolymer can be easily synthesized from a compound having bromine on its terminal.

Further, when a catalyst compound having a halogen atom is used, the halogen atom in the organic halide used as a dormant species may be the same as the halogen atom in the catalyst. The halogen atom in the organic halide used as a dormant species may be different from the halogen atom in the catalyst, since even if the halogen atom in the organic halide and the halogen atom in the catalyst are different, it is possible that the halogen atom in the organic halide and the halogen atom in the catalyst are exchanged. However, if the halogen atom in the organic halide used as a dormant species and the halogen atom in the catalyst are the same, it is easier to exchange the halogen atoms between the organic halide used as a dormant species and the compound of the catalyst. Therefore, preferably, the halogen atom in the organic halide and the halogen atom in the catalyst are the same.

In one embodiment, the organic halide used as a dormant species has the following general formula (II):

$$CR^2R^3R^4X^3 \quad (II)$$

wherein $R^2$ is halogen, hydrogen or alkyl. Preferably, $R^2$ is hydrogen or lower alkyl. More preferably, $R^2$ is hydrogen or methyl.

$R^3$ may be the same as $R^2$, or may be different from $R^2$. $R^3$ is halogen, hydrogen, or alkyl. Preferably, $R^3$ is hydrogen or lower alkyl. More preferably, $R^3$ is hydrogen or methyl.

$R^4$ is halogen, hydrogen, alkyl, aryl, heteroaryl or cyano. Preferably, $R^4$ is aryl, heteroaryl, or cyano. When $R^4$ is halogen, hydrogen, or alkyl, $R^4$ may be the same as $R^2$ or $R^3$, or may be different from $R^2$ or $R^3$.

$X^3$ is halogen. Preferably, $X^3$ is chlorine, bromine, or iodine. More preferably, $X^3$ is bromine, or iodine. Most preferably, $X^3$ is iodine. When there is halogen in $R^2$ to $R^4$, $X^3$ may be the same as the halogen in $R^2$ to $R^4$ or may be different from the halogen in $R^2$ to $R^4$. In one embodiment, $X^3$ may be the same halogen as that contained in the compound of the catalyst. $X^3$ may be different from the halogen contained in the catalyst compound.

The aforementioned $R^2$ to $R^4$ and $X^3$ are selected independently from one another. However, preferably, there is no halogen atom or one halogen atom in $R^2$ to $R^4$ (that is, the organic halide contains one or two halogen atoms in the compound).

In one preferable embodiment, the organic halide used as a dormant species is an alkyl halide or substituted alkyl halide. More preferably, the organic halide used as a dormant species is a substituted alkyl halide. In this regard, preferably, the alkyl is a secondary alkyl. More preferably, the alkyl is a tertiary alkyl.

In the alkyl halide or substituted alkyl halide used as a dormant species, the number of carbon atoms in the alkyl is preferably 2 or 3. Therefore, further preferably, the organic halide used as a dormant species is a substituted ethyl halide or substituted isopropyl halide. The substituent in the substituted alkyl halide used as a dormant species includes, for example, phenyl, cyano, and the like.

Preferable specific examples of the organic halide used as a dormant species include, for example, $CH(CH_3)(Ph)I$ and $C(CH_3)_2(CN)I$, as shown in the following chemical formulas:

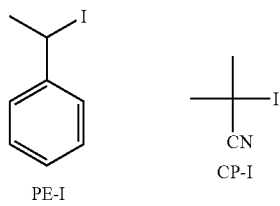

[Formula 16]

PE-I    CP-I

Other specific examples of the organic halide used as dormant species include, for example, methyl chloride, methylene chloride, chloroform, chloroethane, dichloroethane, trichloroethane, bromomethyl, dibromomethane, bromoform, bromoethane, dibromoethane, tribromoethane, tetrabromoethane, bromotrichloromethane, dichlorodibromomethane, chlorotribromomethane, iodotrichloromethane, dichlorodiiodomethane, iodotribromomethane, dibromodiiodomethane, bromotriiodomethane, iodoform, diiodomethane, methyl iodide, isopropyl chloride, t-butyl chloride, isopropyl bromide, t-butyl bromide, triiodoethane, ethyl iodide, diiodopropane, isopropyl iodide, t-butyl iodide, bromodichloroethane, chlorodibromoethane, bromochloroethane, iododichloroethane, chlorodiiodoethane, bromoiodopropane, 2-iodo-2-polyethyleneglycosylpropane, 2-iodo-2-amidinopropane, 2-iodo-2-cyanobutane, 2-iodo-2-cyano-4-methylpentane, 2-iodo-2-cyano-4-methyl-4-methoxypentane, 4-iodo-4-cyano-pentanoic acid, methyl 2-iodoisobutylate, 2-iodo-2-methylpropanamide, 2-iodo-2,4-dimethylpentane, 2-iodo-2-cyanobutanol, 4-methylpentane, cyano-4-methylpentane, 2-iodo-2-methyl-N-(2-hydroxyethyl)propionamide 4-methylpentane, 2-iodo-2-methyl-N-(1,1-bis(hydroxymethyl)-2-hydroxyethyl)propionamide 4-methylpentane, 2-iodo-2-(2-imidazolin-2-yl)propane, 2-iodo-2-(2-(5-methyl-2-imidazolin-2-yl)propane, and the like. One of these halide compounds may be used alone, or a combination of two or more of the halide compounds may be used.

According to the method of the present invention, since the organic halide used as a dormant species is not to be used as a solvent, it is not necessary to use the organic halide in such a large amount so as to provide an effect as a solvent. Thus, the amount of the organic halide used as a dormant species can be limited to an amount smaller than the so-called "solvent amount" (that is, an amount needed to achieve the effect as a solvent). In the method of the present invention, since the organic halide used as a dormant species is used to provide a halogen as a protecting group to a growing chain as described above, it is sufficient so long as a sufficient amount of halogen can be provided to the growing chains in the reaction system. Specifically, for example, in the method of the present invention, the amount of the organic halide used as a dormant species is preferably 0.05 moles or more relative to 1 mole of the organic compound as a catalyst in the polymerization reaction system. More preferably, the amount is 0.5 moles or more relative to 1 mole of the organic compound as a catalyst in the polymerization reaction system. Further preferably, the amount is 1 mole or more relative to 1 mole of the organic compound as a catalyst in the polymerization reaction system. Further, preferably, the amount is 100 moles or less relative to 1 mole of the organic compound as a catalyst in the polymerization system. More preferably, the amount is 30 moles or less relative to 1 mole of the organic compound as a catalyst in the polymerization reaction system. Further preferably, the amount is 5 moles or less relative to 1 mole of the organic compound as a catalyst in the polymerization reaction system. Additionally, the amount is preferably 0.001 moles or more relative to 1 mole of the vinyl-type monomer. More preferably, the amount is 0.005 moles or more relative to 1 mole of the vinyl-type monomer. Further, the amount is preferably 0.5 moles or less relative to 1 mole of the vinyl-type monomer. More preferably, the amount is 0.4 moles or less relative to 1 mole of the vinyl-type monomer. Further preferably, the amount is 0.3 moles or less relative to 1 mole of the vinyl-type monomer. Particularly preferably, the amount is 0.2 moles or less relative to 1 mole of the vinyl-type monomer. Most preferably, the amount is 0.1 moles or less relative to 1 mole of the vinyl-type monomer. Further, if necessary, the amount can be 0.07 moles or less, 0.05 moles or less, 0.03 moles or less, 0.02 moles or less, or 0.01 moles or less relative to 1 mole of the vinyl-type monomer.

Most of the aforementioned organic halides used as dormant species are known compounds. Reagents and the like, which are sold from reagent sellers or the like, can directly be used. Alternatively, the compounds may be synthesized using conventionally known synthesizing methods.

In regard to an organic halide used as a dormant species, it is also possible that raw materials thereof are introduced so as to generate the organic halide in situ, i.e. in the reaction solution, during the polymerization, such that the product can be used as the organic halide for this polymerization method. For example, an azo-type radical initiator (e.g., azobis(isobutyronitrile)) and a molecule as a simple substance of halogen (e.g., iodine ($I_2$)) can be introduced as raw materials, the reaction of the two can generates an organic halide (e.g., CP-I (the chemical formula is as described above), which is an alkyl iodide) in situ during the polymerization, and this product can be used as a dormant species for this polymerization method.

As for the organic halide used as a dormant species, it is also possible to use a compound that is immobilized at a surface such as an inorganic or organic solid surface, or an inorganic or organic molecular surface. For example, an organic halide immobilized on a silicon substrate surface, a polymer film surface, an inorganic or organic microparticle surface, a pigment surface, or the like, can be used. The immobilization can be achieved utilizing, for example, chemical binding, physical binding or the like.

In the polymerization method of the present invention, it is preferable to use an inorganic material which can provide a halogen. That is, once a halogen is provided to an organic compound having oxidation-reduction capability, the organic compound reduces the halogen and the organic compound is oxidized. It is believed that the resulting organic compound in the oxidized state catalyzes the reaction that attaches a halogen to the terminal of the growing chain in a polymer. Accordingly, by providing halogen from the inorganic material to the catalyst, the catalyst activity is significantly improved. Such an inorganic material which provides a halogen is referred to as "halogen-providing inorganic material" for convenience in the present specification. For example, halogen molecules, halogenated inorganic compounds, and the like are usable as halogen-providing inorganic materials. In halogen molecules, it is preferable to use a bromine molecule ($Br_2$) or iodine molecule ($I_2$), and particularly preferable to use an iodine molecule ($I_2$). $NH_4I$, $HI$, and the like are usable as halogenated inorganic compounds.

It is preferable that the amount of a halogen-providing inorganic material used is 0.001 mole or more to 1 mole of an organic compound of the catalyst, more preferred is 0.003 mole or more to 1 mole of an organic compound of the catalyst, further preferred is 0.01 mole or more to 1 mole of an organic compound of the catalyst, much preferred is 0.02 mole or more to 1 mole of an organic compound of the catalyst, and particularly preferred is 0.03 mole or more to 1 mole of an organic compound of the catalyst. In addition, 0.05 mole or more to 1 mole of an organic compound of the catalyst can be adopted if necessary. It is also preferable that the amount of a halogen-providing inorganic material used is 0.5 mole or less to 1 mole of an organic compound of the catalyst, more preferred is 0.3 mole or less to 1 mole of an organic compound of the catalyst, further preferred is 0.2 mole or less to 1 mole of an organic compound of the catalyst, much preferred is 0.15 mole or less to 1 mole of an organic compound of the catalyst. In addition, 0.1 mole or less to 1 mole of an organic compound of the catalyst can be adopted if necessary.

It is preferable that the amount of a halogen-providing inorganic material used is 0.01 millimole or more to 1 mole of a monomer, more preferred is 0.05 millimole or more to 1 mole of a monomer, further preferred is 0.1 millimole or more to 1 mole of a monomer, much preferred is 0.2 millimole or more to 1 mole of a monomer, and particularly preferred is 0.3 millimole or more to 1 mole of a monomer. In addition, 0.5 millimole or more to 1 mole of a monomer can be adopted if necessary. It is also preferable that the amount of a halogen-providing inorganic material used is 100 millimoles or less to 1 mole of a monomer, more preferred is 30 millimoles or less to 1 mole of a monomer, further preferred is 10 millimoles or less to 1 mole of a monomer, much preferred is 5 millimoles or less to 1 mole of a monomer, particularly preferred is 3 millimoles or less to 1 mole of a monomer. In addition, 2 millimoles or less to 1 mole of a monomer can be adopted.

It is preferable that the amount of a halogen-providing inorganic material used is 0.001 mole or more to 1 mole of an organic halide used as a dormant species, more preferred is 0.003 mole or more to 1 mole of the organic halide, further preferred is 0.01 mole or more to 1 mole of the organic halide, much preferred is 0.02 mole or more to 1 mole of the organic halide, and particularly preferably 0.03 mole or more to 1 mole of the organic halide. In addition, 0.05 mole or more to 1 mole of the organic halide can be adopted if necessary. It is preferable that the amount of a halogen-providing inorganic material used is 0.5 mole or less to 1 mole of an organic halide used as a dormant species, more preferred is 0.3 mole or less to 1 mole of the organic halide, more preferred is 0.2 mole or less to 1 mole of the organic halide, much preferred is 0.15 mole or less to 1 mole of the organic halide. In addition, 0.1 mole or less to 1 mole of the organic halide can be adopted if necessary.

It is noted that a halogen-providing inorganic material may be produced in situ during the polymerization and used.

(Monomer)

As a monomer, the polymerization method of the present invention uses a radical polymerizable monomer. A radical polymerizable monomer refers to a monomer having an unsaturated bond which may be subjected to a radical polymerization under the presence of an organic radical. Such an unsaturated bond may be a double bond or triple bond. That is, the polymerization method of the present invention can use an arbitrary monomer, which is conventionally known as a monomer for performing a living radical polymerization.

More specifically, the so-called vinyl monomers can be used. Vinyl monomer is a general name for monomers which are represented by the general formula "$CH_2=CR^5R^6$."

A monomer having the general formula in which $R^5$ is methyl, and $R^6$ is carboxylate, is referred to as a methacrylate-type monomer, and can preferably be used in the present invention.

Specific examples of the methacrylate-type monomer include methyl methacrylate, ethyl methacrylate, propyl methacrylate, n-butyl methacrylate, t-butyl methacrylate, hexyl methacrylate, 2-ethylhexyl methacrylate, nonyl methacrylate, benzyl methacrylate, glycidyl methacrylate, cyclohexyl methacrylate, lauryl methacrylate, n-octyl methacrylate, 2-methoxyethyl methacrylate, butoxyethyl methacrylate, methoxytetraethyleneglycol methacrylate, 2-hydroxyethylmethacrylate, 2-hydroxypropylmethacrylate, 3-chloro-2-hydroxypropylmethacrylate, tetrahydrofurfuryl methacrylate, 2-hydroxy-3-phenoxypropyl methacrylate, diethyleneglycol methacrylate, polyethylene glycol methacrylate, 2-(dimethylamino)ethyl methacrylate, and the like. Further, methacrylic acid can be used. In addition, it is possible to use ion liquid type methacrylates such as 2-(N, N-diethyl-N-methylamino)ethyl methacrylate$^+$/trifluorosulfonyliminium($N(CF_3SO_2)_2^-$) salt, 2-(N-ethyl-N-methyl-N-hydrogenated amino)ethyl methacrylate$^+$/trifluorosulfonyliminium($N(CF_3SO_2)_2$) salt, 1-ethyl-3-methylimidazolium methacrylate$^+$/fluorohydrogenation(($FH)_nF^-$) salt, N-ethyl-N-methylpyrrolidinium methacrylate$^+$/fluorohydrogenation(($FH)_nF^-$) salt.

The aforementioned vinyl monomers having the aforementioned general formula in which $R^5$ is hydrogen and $R^6$ is carboxylate, are generally referred to as acrylic type monomers and can preferably be used in the present invention.

Specific examples of the acrylate-type monomer include methyl acrylate, ethyl acrylate, propyl acrylate, n-butyl acrylate, t-butyl acrylate, hexyl acrylate, 2-ethylhexyl acrylate, nonylacrylate, benzylacrylate, glycidylacrylate, cyclohexyl acrylate, lauryl acrylate, n-octyl acrylate, 2-methoxyethyl acrylate, butoxyethyl acrylate, methoxytetraethyleneglycol acrylate, 2-hydroxyethyl acrylate, 2-hydroxypropyl acrylate, 3-chloro-2-hydroxypropyl acrylate, tetrahydrofurfuryl acrylate, 2-hydroxy-3-phenoxypropyl acrylate, diethyleneglycol acrylate, polyethylene glycol acrylate, 2-(dimethylamino)ethyl acrylate, and the like. Further, an acrylic acid can be used. In addition, it is possible to use ion liquid type acrylates such as 2-(N,N-diethyl-N-methylamino)ethyl acrylate$^+$/trifluorosulfonyliminium($N(CF_3SO_2)_2^-$) salt, 2-(N-ethyl-N-methyl-N-hydrogenated amino)ethyl acrylate$^+$/trifluorosulfonyliminium($N(CF_3SO_2)_2^-$) salt, 1-ethyl-3-methylimidazolium acrylate$^+$/fluorohydrogenation(($FH)_nF^-$) salt, N-ethyl-N-methylpyrrolidinium acrylate$^+$/fluorohydrogenation(($FH)_nF^-$) salt.

Generally, it is difficult to control living radical polymerization of acrylates. However, according to the present invention, it is possible to control it. In particular, when a phosphorus type catalyst is used, polymerization of acrylates can be preferably controlled.

A monomer having the aforementioned general formula of a vinyl monomer, in which $R^5$ is hydrogen and $R^6$ is phenyl, is styrene, can be suitably used in the present invention. A monomer, in which $R^6$ is phenyl or a phenyl derivative, is referred to as a styrene derivative, and can be suitably used in the present invention. Specifically, such a monomer includes o-, m-, or p-methoxystyrene, o-, m-, or p-t-butoxystyrene, o-, m-, or p-chloromethylstyrene, o-, m-, or p-chlorostyrene, o-, m-, or p-hydroxystyrene, o-, m-, or p-styrenesulfonic acid and the like. Further, a monomer in which $R^6$ is aromatic, (for example, vinylnaphthalene) can be used.

A monomer having the aforementioned general formula of a vinyl monomer, in which $R^5$ is hydrogen and $R^6$ is alkyl, is alkylene, and can be suitably used in the present invention.

In the present invention, monomers having two or more vinyl groups can be also used. Specifically, for example, a diene-type compound (e.g., butadiene, isoprene, and the like), a compound having two allyl groups (for example, diallyl phthalate and the like), a dimethacrylate having two methacryl groups (e.g., ethylene glycol dimethacrylate), a diacrylate having two acryl groups (e.g., ethylene glycol diacrylate), and the like, can be used.

Vinyl monomers other than those described above can also be used in the present invention. Specifically, for example, vinyl esters (for example, vinyl acetate, vinyl propionate, vinyl benzoate, vinyl acetate), styrene derivatives other than the aforementioned styrene derivatives (for example, a-methylstyrene), vinyl ketones (for example, vinyl methyl ketone, vinyl hexyl ketone, methyl isopropenyl ketone), N-vinyl compounds (for example, N-vinylpyrrolidone, N-vinyl pyrrole, N-vinyl carbazole, N-vinyl indole), (meth)acrylamide and its derivatives (for example, N-isopropyl acrylamide, N-isopropylmethacrylamide, N,N-dimethylacrylamide, N,N-dimethylmethacrylamide, N-methylolacrylamide, N-methylolmethacrylamide), acrylonitrile, methacrylonitrile, maleic acid and its derivatives (for example, maleic anhydride), halogenated vinyls (for example, vinyl chloride, vinylidene chloride, tetrachloroethylene, hexachloropropylene, vinyl fluoride), olefins (for example, ethylene, propylene, 1-hexene, cyclohexene), and the like.

One of these monomers may be used alone, or a combination of two or more of the monomers may be used.

There is no particular limitation to the combinations of the aforementioned monomer and the catalyst of the present invention. A catalyst of the present invention, which is arbitrarily selected, may be used for a monomer, which is arbitrarily selected.

(Radical Reaction Initiator)

In the living radical polymerization method of the present invention, as the occasion demands, a small amount of a radical reaction initiator may be used. Initiators, which are known as initiators to be used for a radical reaction, can be used as the radical reaction initiator. For example, azo-type radical reaction initiators and peroxide-type radical initiators can be used. Specific examples of azo-type radical reaction initiators include, for example, azobis(isobutyronitrile). Specific examples of peroxide-type radical reaction initiators include, for example, benzoylperoxide, dicumyl peroxide, t-butyl peroxybenzoate (BPB), di(4-tert-butylcyclohexyl) peroxydicarbonate (PERKADOX16), and potassium peroxodisulfate.

However, when the catalyst of the present invention is used, even though such a radical reaction initiator is not used, a polymerization reaction is successfully performed.

In order to maximize the effect of avoiding adverse effects due to a radical initiator, it is preferable that a radical initiator is not substantially used, and it is most preferable that the amount of use is zero. In this regard, "not substantially used" means that the amount of a radical initiator is small so that effects due to a radical initiator on a polymerization reaction do not substantially occur. Specifically, for example, the amount of the radical initiator is preferably 10 millimoles or less to 1 mole of the catalyst of the present invention, and more preferably 1 millimoles or less to 1 mole of the catalyst of the present invention. Further preferably, the amount is 0.1 millimoles or less to 1 mole of the catalyst of the present invention.

However, when it is necessary to use a radical initiator actively for some reasons, the amount of the initiator used is not particularly limited. The amount is preferably 1 millimole or more to 1 liter of the reaction solution, more preferably 5 millimoles or more to 1 liter of the reaction solution, and further preferably 10 millimoles or more to 1 liter of the reaction solution. Additionally, the amount is preferably 500 millimoles or less to 1 liter of the reaction solution, more preferably 100 millimoles or less to 1 liter of the reaction solution, and further preferably 50 millimoles or less to 1 liter of the reaction solution.

(Solvents)

When a reaction mixture of a monomer and other ingredients is liquid at the reaction temperature, it is not always necessary to use a solvent. If necessary, a solvent may be used. Solvents, which were conventionally used for a living radical polymerization, can be used in the method of the present invention. When a solvent is to be used, the amount of use is not particularly limited as long as the polymerization reaction is appropriately carried out; however, it is preferable to use a solvent in an amount of 1 part by weight or more relative to 100 parts by weight of the monomer, more preferable to use 10 parts by weight or more, and even more preferable to use 50 parts by weight or more relative to 100 parts by weight of the monomer. When the amount of use of the solvent is too small, the viscosity of the reaction solution may be excessively high. Furthermore, it is preferable to limit the amount to 2000 parts by weight or less, more preferable to limit the amount to 1000 parts by weight or less, and even more preferable to limit the amount to 500 parts by weight or less relative to 100 parts by weight of the monomer. When the amount of use of the solvent is too large, the monomer concentration in the reaction solution may be excessively low.

Emulsion polymerization, dispersion polymerization or suspension polymerization can also be carried out by using a solvent that is not miscible with the monomer. For example, in the case of using styrene or methacrylate as the monomer, water can be used as the solvent, such that emulsion polymerization, dispersion polymerization or suspension polymerization can be carried out.

(Other Additives and the Like)

To the various aforementioned materials used for the living radical polymerization, known additives and the like may be added as necessary, in their required amounts. Examples of such additives include, for example, a polymerization suppressant and the like.

(Raw Material Composition)

By mixing the various raw materials described above, a raw material composition that is appropriate as a material for the living radical polymerization, is obtained. The obtained composition can be used in the conventionally known methods for a living radical polymerization.

According to one embodiment, the raw material composition does not include any raw material other than the various raw materials mentioned above. For example, it is preferable, from the viewpoint of environmental problems and the like, that the raw material composition does not substantially include a raw material containing a transition metal. According to a preferred embodiment, the raw material composition does not substantially include any raw material other than a catalyst, a monomer having a radical-reactive unsaturated bond, a solvent, an organic halide having a carbon-halogen bond used as a dormant species, and a halogen molecule or halogenated inorganic compound. It is also preferable that the raw material composition does not substantially include any material irrelevant to a living radical polymerization (for example, an episulfide compound or the like). Furthermore, if it is desired to make the best possible use of the advantage of the catalyst that consists of an organic compound having an oxidation-reduction capability, the raw material composition can be prepared as a composition that does not substantially include any catalyst or catalyst precursor for a living radical polymerization other than the catalyst which consists of an organic compound having an oxidation-reduction capability.

According to one embodiment, the raw material composition includes a catalyst, a monomer having a radical-reactive unsaturated bond, an organic halide having a carbon-halogen bond used as a dormant species, and a halogen molecule or halogenated inorganic compound, and may further include a solvent.

(Raw Material Composition Including Catalyst)

Preferably, the raw material composition includes a catalyst, a monomer having a radical-reactive unsaturated bond, and an organic halide having a carbon-halogen bond used as a dormant species. More preferably, the composition further comprises a halogen molecule or halogenated inorganic compound which can provide a halogen. The raw material composition may further include a solvent, in addition to these.

According to one embodiment, the raw material composition is a composition substantially consisting of a catalyst, a monomer having a radical-reactive unsaturated bond, an organic halide having a carbon-halogen bond used as a dormant species, a halogen molecule or halogenated inorganic compound and a solvent. Here, if not needed, the solvent may not be contained. The raw material composition is, for example, a composition that does not substantially include any component participating in the radical polymerization reaction, other than a catalyst, a monomer having a radical-reactive unsaturated bond, an organic halide having a carbon-halogen bond used as a dormant species, a halogen molecule or halogenated inorganic compound and a solvent. Also, the composition may consist of only a catalyst, a monomer having a radical-reactive unsaturated bond, an organic halide having a carbon-halogen bond used as a dormant species, a halogen molecule or halogenated inorganic compound and a solvent. It should be noted that, in this case as well, if not needed, the solvent may not be contained.

(Reaction Temperature)

A reaction temperature in the method of the present invention is not particularly limited. Preferably, the reaction temperature is 10° C. or more. More preferably, the reaction temperature is 20° C. or more. Further preferably, the reaction temperature is 30° C. or more. Still preferably, the reaction temperature is 40° C. or more. Particularly preferably, the reaction temperature is 50° C. or more. Additionally, the reaction temperature is preferably 130° C. or less. More preferably, the reaction temperature is 120° C. or less. Further preferably, the reaction temperature is 110° C. or less. Still preferably, the reaction temperature is 105° C. or less. Particularly preferably, the reaction temperature is 100° C. or less.

When the temperature is too high, there is a disadvantage in that heating facilities and the like may be expensive. When the temperature is at room temperature or lower, there is a disadvantage that cooling facilities and the like may be expensive. Additionally, if a reaction mixture is prepared such that polymerization occurs at room temperature or lower, the reaction mixture is unstable at room temperature and may react. Therefore, there is the disadvantage that it is difficult to store the reaction mixture. Therefore, the aforementioned range of the temperature, which is slightly higher than room temperature but is not too high (for example, 50° C. to 100° C.) is very preferable in terms of practical sense.

(Reaction Period of Time)

The reaction time period in the method of the present invention is not particularly limited. Preferably, the reaction time period is 15 minutes or more. More preferably, the reaction time period is 30 minutes or more. Further preferably, the reaction time period is 1 hour or more. Additionally, the reaction time period is preferably 3 days or less. More preferably, the reaction time period is 2 days or less. Further preferably, the reaction time period is 1 day or less.

If the reaction time period is too short, it is difficult to obtain a sufficient molecular weight (or a ratio of polymerization (conversion ratio of monomer)). If the reaction time period is too long, the efficiency of the entire process would be unsatisfactory. Advantageous results (an adequate monomer conversion and reduction of a side reaction) may be achieved by selecting a suitable reaction time period.

(Atmosphere)

The polymerization reaction in the method of the present invention may be carried out under a condition where air is present in the reaction vessel. Further, if necessary, the air may be replaced with an inert gas such as nitrogen or argon.

(Initiation of the Polymerization)

In the present invention, an organic compound having oxidation-reduction capability can take both states, which are oxidized state and reduced state. When polymerization is initiated, it is not preferable that all catalyst compounds are in one state, but preferable that both of a catalyst compound in oxidized state and a compound in reduced state are present. It is believed that since both of the catalyst compound in the oxidized state and the catalyst compound in the reduced state are present, the reversible activation reaction of a dormant species (polymer-X) to the growing chain radical (polymer.) can proceed efficiently.

A method of allowing both of the catalyst compound in the oxidized state and the catalyst compound in the reduced state to be present may be, for example, to prepare the catalyst compound in the oxidized state and the catalyst compound in the reduced state, separately, and then mix them. Alternatively, a method to oxidize some of the catalyst compounds in the reduced state to those in the oxidized state may be used. Conversely, a method to reduce some of the catalyst compounds in the oxidized state to those in the reduced state may be also used.

When the aforementioned halogen-providing inorganic material is mixed in the reaction mixture, an appropriate mixture can be readily obtained. For example, a method of adding iodine ($I_2$) to the reaction mixture is preferred.

The method for living radical polymerization of the present invention can be applied to homopolymerization, that is, production of a homopolymer, and it is also possible to produce a copolymer using the method of the present invention in copolymerization. The copolymerization may be random copolymerization, or may also be block copolymerization.

The block copolymer may be a copolymer having two or more types of blocks linked together, or may be a copolymer having three or more types of blocks linked together.

In the case of block copolymerization using two types of blocks, for example, a block copolymer can be obtained by a method including a step of polymerizing a first block and a step of polymerizing a second block. In this case, the method of the present invention may be used in the step of polymerizing the first block, or the method of the present invention may be used in the step of polymerizing the second block. It is preferable to use the method of the present invention in both of the process of polymerizing the first block and the process of polymerizing the second block.

More specifically, for example, a block copolymer can be obtained by polymerizing the first block, and then carrying out the polymerization of the second block in the presence of the obtained first polymer. The first polymer can be supplied to the polymerization of the second block after isolation and purification, or the polymerization of blocks can also be carried out by adding the second monomer to the first polymerization in the middle of or at the completion of the polymerization of the first polymer, without isolation and purification of the first polymer.

Also in the case of producing a block copolymer having three types of blocks, the steps of polymerizing the respective blocks are carried out in the same manner as in the instance of producing a copolymer having two or more types of blocks linked together, and thereby a desired copolymer can be obtained. It is also preferable to use the method of the present invention in all of the block polymerization steps.

(Reaction Mechanism)

Although the present invention is not particularly bound to a theory, an inferred mechanism will be explained.

The basic concept of a living radical polymerization method is a reversible activating reaction of a dormant species (polymer-X) to a growing chain radical (polymer.). A method, which uses a halogen as protecting group X and uses a transition metal complex as an activating catalyst, is one of the useful living radical polymerization methods. According to the present invention, an organic compound is used. It is possible to abstract a halogen from an organic halide with high reactivity. It is possible to produce a radical reversibly (Scheme 1).

It has been recognized that, generally, a transition metal can have electrons in various transition states and therefore, a transition metal is superior in the catalytic activity for various chemical reactions. Therefore, regarding catalysts suitable for a living radical polymerization, it is considered that a transition metal is superior. On the contrary, a typical element is considered disadvantageous for such a catalyst. That is, it was considered that an organic compound is disadvantageous for a catalyst.

However, unexpectedly, according to the present invention, a catalyst consisting of an organic compound having an oxidation-reduction capability is used, and thereby the polymerization reaction proceeds with very high efficiency. It is considered that this is because the oxidation-reduction reaction of the central element is suitable for performing the exchange of the halogen between the catalyst and the reaction intermediate. Accordingly, it is basically considered that an organic compound having the oxidation-reduction capability can catalyze the living radical polymerization satisfactorily.

The following Scheme 1 shows the reaction formula in the case of using the catalyst of the present invention.

(Scheme 1)

[Formula 17]

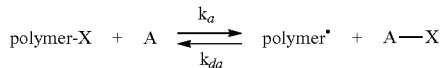

wherein A is an organic compound having oxidation-reduction capability, and X is a halogen atom. A is in the reduced state on the left side of the reaction formula, and in the oxidized state on the right side. Further, the living radical polymerization is controlled by performing a reversible oxidation-reduction reaction between the reduced state and the oxidized state thereof.

For example, when TDAE is used as a catalyst, the reaction formula is understood as follows. On the right side, it can take the state of a salt where one electron has transferred between TDAE and the halogen, or the state of a complex where a partial charge has transferred between TDAE and the halogen.

generally in the chemical field, there is a case where the oxidation-reduction in the narrow sense and the complex formation are used in different meanings. However, in the present invention, the aforementioned oxidation-reduction in the broad sense, i.e., the transfer of electron (charge) is generally applied as the mechanism of the present invention. Therefore, in the present specification, the term "oxidation-reduction" is used in the meaning which encompasses the idea of the "complex formation," which is the transfer of partial charge.

Even if the term oxidation-reduction is used in the narrow sense, the oxidation-reduction in the narrow sense and the complex formation are common in that they are the idea to explain the transfer of charge. Further, in the present invention, since the phenomenon of the charge transfer, which is common between the two, the oxidation-reduction in the narrow sense and the complex formation, is utilized in catalytic action, there is substantially no difference between the consideration for the present invention based on the mechanism of the oxidation-reduction in the narrow sense and the consideration for the present invention based on the mechanism of the complex formation.

(Removal of Halogen Bound to an End of Produced Polymer)

The produced polymer that is obtained by the method of the present invention has halogen (for example, iodine) at

[Formula 18]

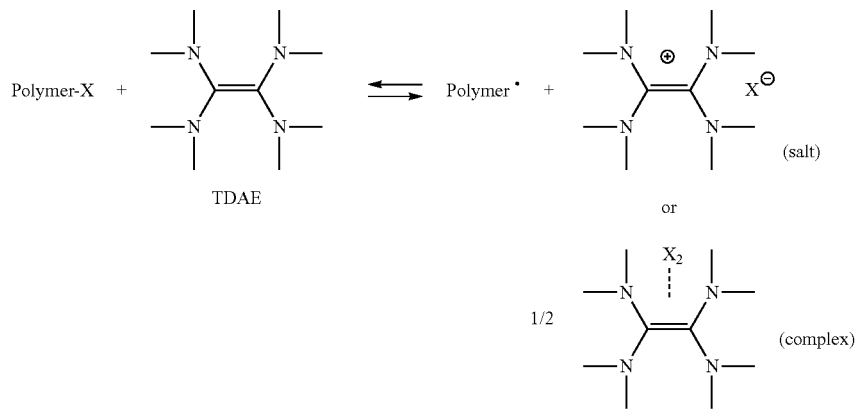

A compound which is studied in recent years as an organic substance having a hole-transporting capability In this regard, regarding the mechanism of the present invention, "oxidation-reduction" and "complex formation" have substantially almost identical technical meaning.

Commonly, the term oxidation-reduction is used as the idea to generally explain the transfer of electron (charge). In the present specification, the term oxidation-reduction is also used as the idea in a broad sense to generally explain the transfer of electron (charge).

However, sometimes, the term oxidation-reduction is used as the idea to explain the transfer of one electron (charge), i.e., the idea in the narrow sense. On the other hand, the term complex formation is frequently used as the idea to explain the transfer of partial charge. Accordingly, the chain end. When this polymer is to be used in products, if needed, the polymer can be used after removing the halogen at the end. It is also possible to positively utilize the halogen at the end and to convert this into a different functional group, so as to bring out a new function. The reactivity of the halogen at the end is generally high, and the removal or conversion of the halogen can be carried out by a wide variety of reactions. For example, examples of methods of treating the polymer end when the halogen is iodine, will be shown in the following scheme. The polymer end can be utilized by the reactions shown in these schemes or the like. Even when the halogen is other than iodine, the polymer end can be converted into a functional group in the same manner.

(Scheme 3)

Conversion of terminal iodine

[Formula 19]

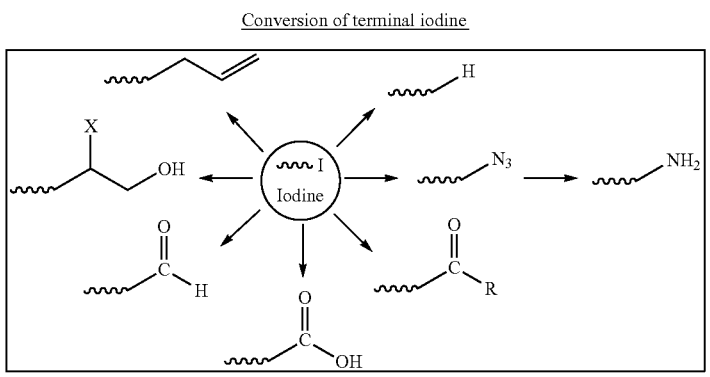

(Reference) Matyjaszewski, K., Davis, T. P., Eds.; Handbook of Radical Polymerization; Wiley & Sons: New York, 2002.

Simple removal/conversion of terminal iodine

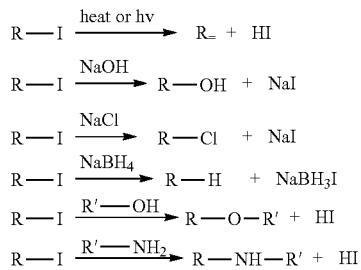

(Use of the Polymer)

According to the aforementioned living radical polymerization method of the present invention, a polymer having narrow molecular weight distribution is obtained. For example, it is possible to select a suitable formulation of reaction material, reaction conditions and the like, such that a polymer having the $M_w/M_n$ ratio, which is the ratio of the weight average molecular weight $M_w$ to the number average molecular weight $M_n$, is 1.5 or less. It is also possible to select a further suitable formulation of the reaction material and reaction conditions such that a polymer having the $M_w/M_n$ ratio of 1.4 or less, a polymer having the $M_w/M_n$ ratio of 1.3 or less, a polymer having the $M_w/M_n$ ratio of 1.2 or less, or a polymer having the $M_w/M_n$ ratio of 1.1 or less is obtained. It is noted that according to the living radical polymerization method of the present invention, also when the halogen atom in the organic halide used as a dormant species is a bromine, it is possible to obtain a polymer having the $M_w/M_n$ ratio of 2.0 or less, and a polymer having a narrower molecular weight distribution than conventional radical polymerization method is obtained. As described above, a bromine compound is more stable than a iodine compound. Therefore, the necessity for removing terminal halogen from the produced polymer is relatively low, and the utility of the obtained polymer is quite high. Further, many compounds having a plurality of bromine are commercially sold or can be easily synthesized. Therefore, polymers having various topology (branches) such as star-type polymer, comb-type polymer, and surface graft polymer can be easily obtained. Therefore, also when the halogen atom in the aforementioned organic halide is bromine, the obtained polymer can be preferably used for the uses described below.

The polymer obtained by the living radical polymerization method of the present invention can be applied for various uses. For example, the polymer can be used for manufacturing materials for resistor, adhesives, lubricants, paint, ink, dispersants, packaging materials, pharmaceuticals, personal care products (such as hairdressing material, cosmetics, and the like), elastomers (such as material for automobiles, industrial articles, sports article, materials for coating electrical wire, materials for buildings, and the like), coating materials (such as materials for powder coating, and the like), and the like. Furthermore, it can be used for creating a new electronic material, optical material, dynamic material, crystal material, separation material, lubricant material, and medical material.

The polymer obtained by the living radical polymerization method of the present invention can also be advantageously used in various applications from the viewpoint that the amount of catalyst remaining in the polymer is low. That is, since the amount of catalyst can be decreased relative to the conventional transition metal-based catalysts and the like, the obtained resins acquire high purity, and the polymer can be suitably used in the applications where a high purity resin is required. The catalyst residue may be removed from the produced polymer, or may not be removed, depending on the application. The polymer may be molded, or dissolved or dispersed in a solvent or a dispersion medium depending on the various applications. However, the molded polymer, or the dissolved or dispersed polymer also maintains the advantages of the present invention, and thus these polymers still belong to the scope of the polymer obtained by the polymerization method of the present invention.

The polymer synthesized using the polymerization method of the present invention has advantages such as the advantage that the molecular weight distribution is narrow, the advantage that the amount of catalyst remaining in the polymer is low, and the advantage that the cost is low, and thus the polymer can be utilized in various applications by making the best use of these advantages.

For example, a homopolymer, a random copolymer and a block copolymer formed from benzyl methacrylate and having narrow molecular weight distribution, can be used as high performance materials for resistor.

Further, for example, a polymer of methacrylate (for example, dimethylaminomethacrylate or 2-hydroxyethyl methacrylate), methacrylic acid, acrylate, acrylic acid or the like can be used in applications such as adhesives, paints, inks and pigment dispersants.

Further, when a polybranched polymer is synthesized by the method of the present invention, the polymer is useful as a lubricant.

Further, polymers obtained by the method of the present invention (for example, hydroxyethyl methacrylate, polyethylene glycol methacrylate, and the like) are also useful as drug sustained-release materials or medical materials.

Further, polymers obtained by the method of the present invention (for example, dimethylaminomethacrylate, methacrylic acid, 2-hydroxyethyl methacrylate, polyethylene glycol methacrylate, and the like) are also useful for personal care products (for example, hairdressing materials or cosmetic products).

Further, polymers obtained by the method of the present invention (for example, acrylate, methacrylate, styrene, diene and the like) are also useful in applications such as elastomer or coating.

Further, polymers obtained by the method of the present invention are also useful in the creation and production of non-conventional new electronic materials, optical materials, mechanical materials, crystalline materials, separation materials, lubricant materials, medical materials and the like.

Furthermore, the method of the present invention can be, for example, applied to surface graft polymerization, and can produce high density polymer brushes that can be used in various applications.

Further, when a compound that does not have electroconductivity is used as a catalyst, a polymer that can be suitably used even in applications where the absence of any residual electroconductive impurities in the polymer is required (for example, resist materials, organic electroluminescence materials and the like), is obtained.

The catalyst of the present invention is characterized in that the organic compound has a capability of performing an oxidation-reduction reaction. As a result of the research of the inventors of the present invention, it was found that organic compounds having an oxidation-reduction capability can catalyze reversible activation of growth terminals of a radical polymerization reaction by the oxidation-reduction capability. Therefore, an organic compound having the oxidation-reduction capability can serve as a potent catalyst.

EXAMPLES

Hereinafter, Examples of the present invention will be explained. However, the present invention is not limited by these Examples.

The monomers, alkyl halides to be used as dormant species, and catalysts used in the following examples are shown as follows.

(Compounds Used)

First, the structures of the main compounds used in the Examples are described below:

(Monomers)

The structures of the monomers used in the Examples are described below:

[Formula 20]

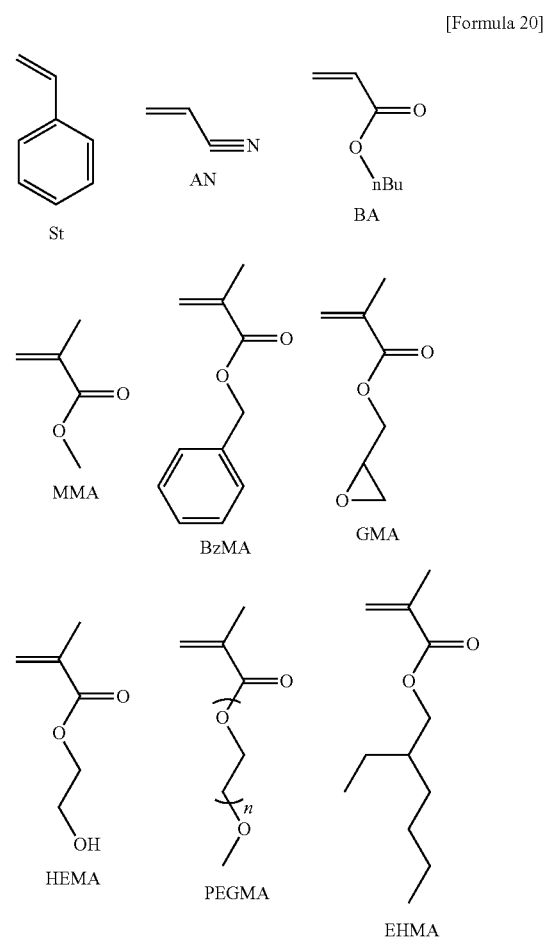

(Catalysts and Organic Halide Compounds to be Used as Dormant Species)

The structural formulas of the catalyst compounds and the organic halide compounds to be used as dormant species (CPI) used in the Examples are shown below:

[Formula 21A]

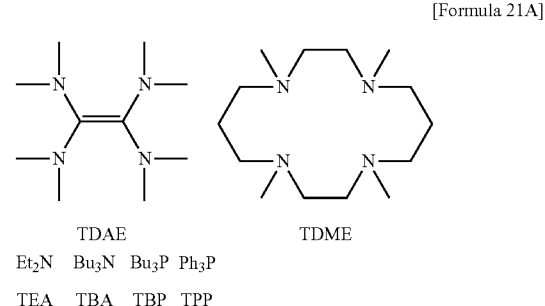

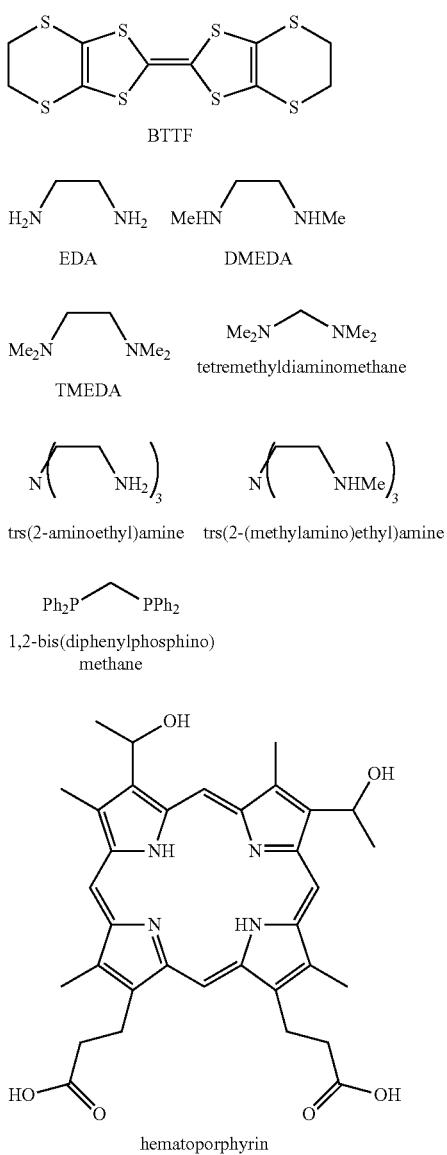

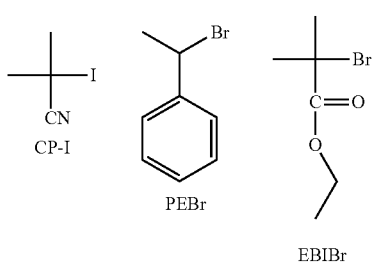

Example 1 and Comparative Example 1

Polymerization of Methyl Methacrylate (MMA) Using TDAE as a Catalyst (Entry 1-1)

80 mM of 2-cyanopropyl iodide (CP-I: the chemical structural formula is as described above) was used as an alkyl halide that is to be used as a dormant species. 40 mM of tetrakisdimethylaminoamine (TDAE: the chemical structural formula is as described above) was used as a catalyst. A radical initiator such as an organic peroxide or diazo compound was not used. These materials were dissolved in 3 g of methyl methacrylate (MMA) to obtain a reaction solution having the aforementioned concentrations. The monomer concentration was about 8 M. The solubilities of these materials were satisfactory, and a homogenous solution was formed. The remaining oxygen was replaced with argon. The reaction solution was heated to 80° C. to perform the polymerization reaction. The experimental results are shown in entry 1-1 in Table 1.

It is noted that regarding concentrations, "mM" refers to the number of millimoles relative to 1 liter of a monomer. For example, 80 mM means that 80 millimoles of a solute is dissolved in 1 liter of a monomer. Regarding concentrations, "M" refers to the number of moles relative to 1 liter of a monomer. For example, 8 M means that 8 moles of a solute is dissolved in 1 liter of a monomer. It is noted that in the case of MMA, 1 liter of a monomer (bulk) is 8 moles at room temperature.

(Entry 1-2)

Experiments were carried out in the same manner as in the experiments of aforementioned entry 1 except that 2 mM of iodine ($I_2$) was used. The experimental results are shown in entry 2 of Table 1. PDI was 1.18, and a polymer having very narrow molecular weight distribution was obtained. In this polymerization reaction, it is believed that iodine was reacted with TDAE to give positive charge to TDAE, and facilitated the catalytic action.

(Entry 1-3)

The experiments were carried out in the same manner as in the experiments of aforementioned entry 1 except that CP-I was not used. The experimental results are shown in entry 3 in Table 1.

In the following tables, PDI denotes the ratio of $M_w/M_n$. Further, $M_n$ is a number average molecular weight of the obtained polymer.

$M_{n,theo}$ denotes a theoretical value calculated according to the following formula:

$$M_{n,theo} = ([M]_0/[R-I]_0) \times (\text{molecular weight of the monomer}) \times (\text{conv})/100 \quad \text{[Numerical formula 1]}$$

wherein $[M]_0$ and $[R-I]_0$ are the initial concentrations (charge concentration) of a monomer and an alkyl iodide that is to be used as a dormant species, respectively; and cony is the monomer conversion ratio (polymerization ratio).

In this polymerization, it is believed that by the oxidation-reduction reaction between TDAE and the oxidized state thereof (the state where TDAE has positive charge), the reaction between a radical at the growth terminal of the polymer (polymer.) and iodine was catalyzed and thus the living radical polymerization proceeded.

In view of the molecular weight of TDAE (about 200), the amount of 40 mM used in the experiment of entry 1-1 to entry 1-3 in Table 1 corresponds to about 0.9% by weight in the MMA monomer solution. This amount is about one tenth (about 1/10) in comparison with the amount of the catalyst (8.9% by weight) used in the experimental example described in Non-Patent Document 1 which is described later. As described above, the living radical polymerization reaction can be conducted with a quite small amount of the catalyst. Therefore, it was confirmed that the activity of the catalyst is very high.

From the tacticity of the produced polymers, it was confirmed that the present polymerizations were radical polymerizations.

Example 2

Polymerization of Methyl Methacrylate (MMA) Using TDME (Entry 2-1 to Entry 2-2)

40 mM of 1,4,8,11-tetramethyl-1,4,8,11-tetraazacyclotetradecane (TDME; the chemical structural formula thereof is as described above) was used instead of TDAE. As shown in entry 4-5) of Table 1, the polymerization of methyl methacrylate (MMA) was carried out in the same manner as in Example 1 except that the reaction materials and reaction condition were changed. The results are shown in Table 1.

Although TDME is different from TDAE and does not have a conjugated bond, it was confirmed to act as a catalyst for living radical polymerization.

Comparative Example 1

Polymerization of Methyl Methacrylate (MMA) without Using a Catalyst

Experiments were carried out in the same manner as in the entry 1-2 of Example 1 except that TDAE, CP-I and iodine (I2) were not used. The results are shown in entry C-1 in Table 1. A polymer having narrow molecular weight distribution was not obtained.

Example 3

Polymerization of Methyl Methacrylate (MMA) Using TEA (Entry 3-1)

In place of TDAE, 120 mM of triethylamine (TEA; the chemical structural formula is as described above) was used. Polymerization of methyl methacrylate (MMA) was carried out in the same manner as in Example 1 except that the reaction materials and reaction conditions were changed as shown in entry 3-1 in Table 2. The results are shown in Table 2.

(Entry 3-2 to Entry 3-5)

Polymerization of methyl methacrylate (MMA) was carried out in the same manner as in the entry 3-1 except that the reaction materials and reaction conditions were changed as shown in entry 3-2 to entry 3-5 in Table 2. The results are shown in Table 2.

Figure 1B:
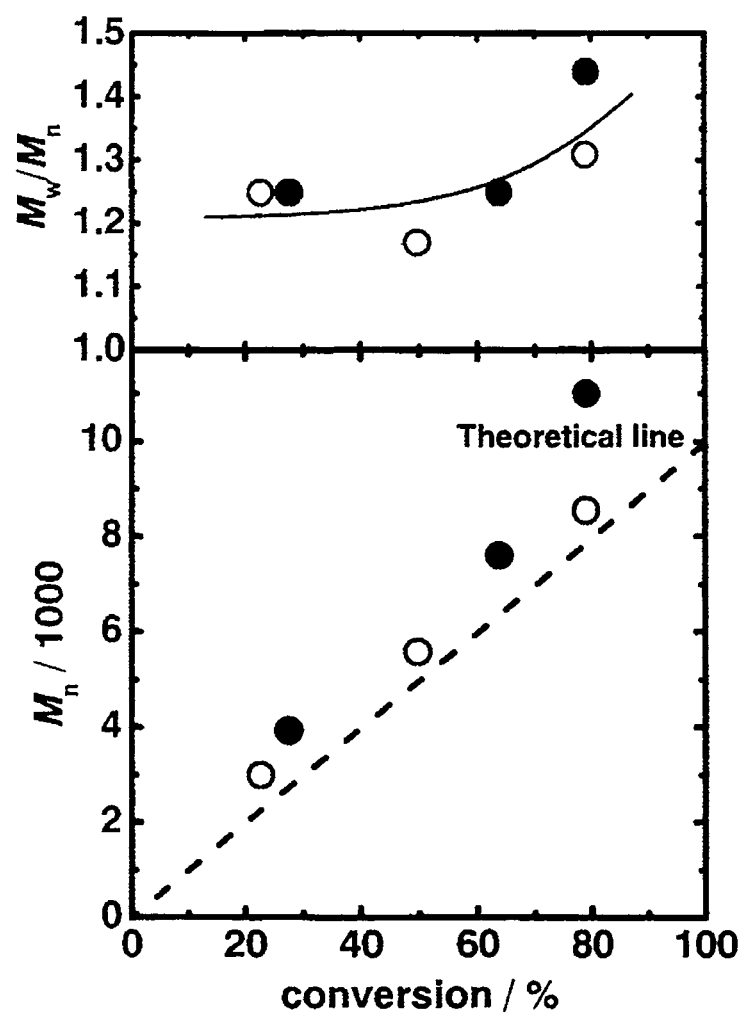
FIG. 1b shows a graph plotting $M_n$ and $M_w/M_n$ versus Conversion (polymerization ratio) for the result of performing at 80° C. the polymerization of methyl methacrylate (MMA) containing CP-I (80 mM), TEA (120 mM or 40 mM), and $I_2$ (1 mM). White circles represent the values of TEA 40 mM. Black circles represent the values of TEA 120 mM. The obtained results are consistent with the theoretical values, which are indicated as Theoretical line. $M_n$ is well consistent with the theoretical value at any concentration of TEA.

The polymerization results of entry 3-1 and entry 3-2 are shown in FIG. 1. $M_n$ was approximately in proportion to the conversion ratio, and PDI was low from the early stage of the polymerization. The polymerization was successfully controlled.

Figure 2A:
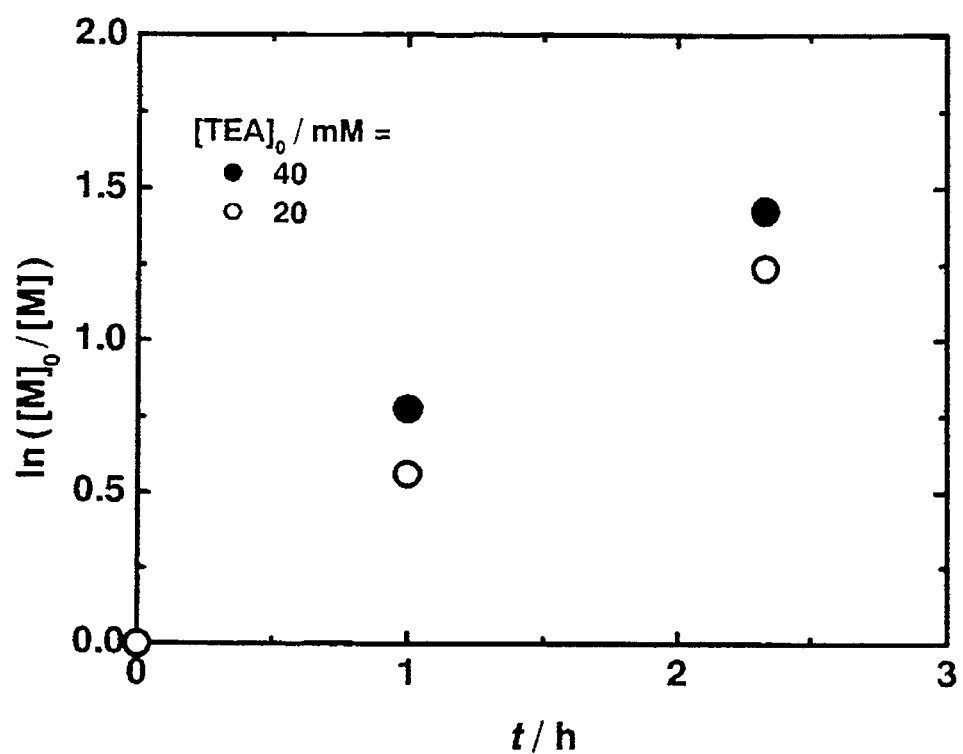
FIG. 2a shows a graph plotting $\ln([M]_0/[M])$ versus t (hour) for the result of performing at 90° C. the polymerization of methyl methacrylate (MMA) containing CP-I (80 mM), TEA (40 mM or 20 mM), and $I_2$ (1 mM). White circles represent the values of TEA 20 mM. Black circles represent the values of TEA 40 mM.
Figure 2B:
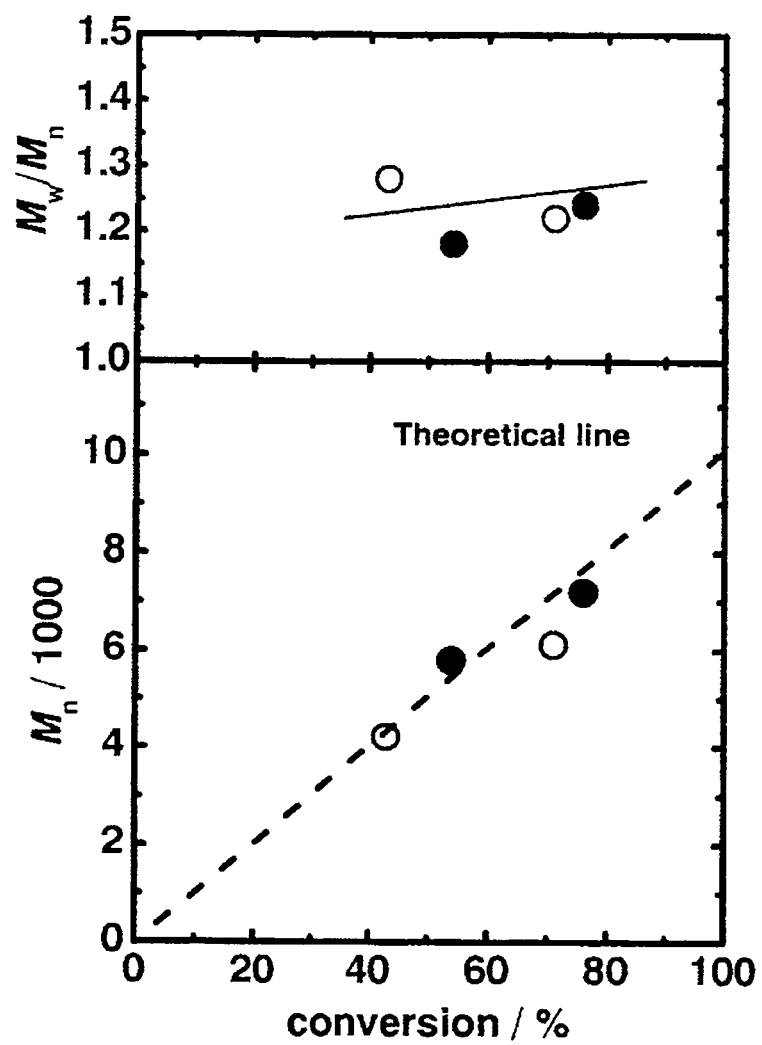
FIG. 2b shows a graph plotting $M_n$ and $M_w/M_n$ versus Conversion (polymerization ratio) for the result of performing at 90° C. the polymerization of methyl methacrylate (MMA) containing CP-I (80 mM), TEA (40 mM or 20 mM), and $I_2$ (1 mM). White circles represent the values of TEA 20 mM. Black circles represent the values of TEA 40 mM. The obtained results are consistent with the theoretical values, which are indicated as Theoretical line. $M_n$ is well consistent with the theoretical value at any concentration of TEA.

The polymerization results of entry 3-3 and entry 3-4 are shown in FIG. 2. $M_n$ was approximately in proportion to the conversion ratio, and PDI was low from the early stage of the polymerization. The polymerization was successfully controlled.

(Entry 3-6)

To a MMA monomer, toluene was added as a solvent to prepare a 50 weight % monomer solution, and a polymerization reaction was conducted. Polymerization of methyl methacrylate (MMA) was carried out in the same manner as in entry 3-1 except that the reaction materials and reaction conditions were changed as shown in entry 3-6 in Table 2. The results are shown in Table 2.

The stereoregularity of PMMA produced by using TEA was researched by using $^{13}$C-NMR. As a result, the stereoregularity of tetrad distribution was approximately in agreement with that of PMMA produced by a free radical polymerization. From this fact, it was found that the polymerization using TEA as a catalyst proceeds with a free radical mechanism.

TABLE 1

| entry | monomer (equivalents to [R-I]) | catalyst | R-X | $[M]_0/[R-X]_0/$ $[cat]_0/[I_2](mM)$ | T (° C.) | t (h) | conv (%) | $M_n$ ($M_{n,theo}$) | PDI |
|---|---|---|---|---|---|---|---|---|---|
| 1-1 | MMA (100) Bulk | TDAE | CP-I | 8000/80/40/0 | 90 | 2 | 35 | 7200 (3500) | 1.83 |
| 1-2 | MMA (100) Bulk | TDAE | CP-I | 8000/80/40/2 | 90 | 2 | 30 | 4300 (3000) | 1.18 |
| 1-3 | MMA (100) Bulk | TDAE | none | 8000/0/40/0 | 90 | 1 | 0.6 | 100000 | 1.64 |
| 2-1 | MMA (100) Bulk | TDME | CP-I | 8000/80/40/0 | 90 | 1 | 85 | 7300 (8500) | 1.61 |
| 2-2 | MMA (100) Bulk | TDME | CP-I | 8000/80/40/2 | 90 | 0.5 | 56 | 7800 (5600) | 1.19 |
|  |  |  |  |  |  | 2 | 74 | 10000 (7400) | 1.35 |
| C-1 | MMA Bulk | none | none | 8000/0/0/0 | 90 | 1 | 0.3 | 403700 | 2.28 |

Monomer: methyl methacrylate (MMA)
Monomer concentration: 8M (bulk)
Alkyl halide to be used as a dormant species (R-I): 2-cyanopropyl iodide (CP-I)
Catalyst: TDAE (tetrakisdimethylaminoamine),
TDME (1,4,8,11-tetramethyl-1,4,8,11-tetraazacyclotetradecane), $I_2$
A radical initiator (In) was not used.
$M_n$ and PDI: Molecular weight and polydispersity obtained by gel permeation chromatography (GPC) with tetrahydrofuran (THF) as an eluent calibrated by polystyrene (PSt) standard.

TABLE 2

| entry | monomer (equivalents to [R-I]) | catalyst | R-X | [M]$_0$/[R-X]$_0$/[cat]$_0$/[I$_2$](mM) | T (° C.) | t (h) | conv (%) | M$_n$ (M$_{n,theo}$) | PDI |
|---|---|---|---|---|---|---|---|---|---|
| 3-1 | MMA (100) Bulk | TEA | CP-I | 8000/80/120/1 | 80 | 1 | 28 | 3900 (2800) | 1.25 |
| | | | | | | 2 | 64 | 7600 (6400) | 1.25 |
| | | | | | | 3 | 79 | 11000 (7900) | 1.44 |
| 3-2 | MMA (100) Bulk | TEA | CP-I | 8000/80/40/1 | 80 | 1 | 23 | 3000 (2300) | 1.25 |
| | | | | | | 2 | 50 | 5600 (5000) | 1.17 |
| | | | | | | 5 | 80 | 8530 (8000) | 1.31 |
| 3-3 | MMA (100) Bulk | TEA | CP-I | 8000/80/40/1 | 90 | 1 | 54 | 5800 (5400) | 1.18 |
| | | | | | | 2.33 | 76 | 7200 (7600) | 1.24 |
| 3-4 | MMA (100) Bulk | TEA | CP-I | 8000/80/20/1 | 90 | 1 | 43 | 4200 (4300) | 1.28 |
| | | | | | | 2.33 | 71 | 6100 (7100) | 1.22 |
| 3-5 | MMA (100) Bulk | TEA | CP-I | 8000/80/5/1 | 90 | 24 | 46 | 2600 (4600) | 1.3 |
| 3-6 | MMA (100) | TEA | CP-I | 8000/40/60/0.5 (50% toluene (solution polymerization)) | 80 | 2 | 30 | 4900 (3000) | 1.17 |
| | | | | | | 3 | 46 | 6900 (4600) | 1.17 |
| | | | | | | 5 | 67 | 10200 (6700) | 1.26 |

Monomer: methyl methacrylate (MMA)
Monomer concentration: 8M (bulk), 4M (50% toluene solution)
Alkyl halide to be used as a dormant species (R-I): 2-cyanopropyl iodide (CP-I)
A radical initiator (In) was not used.
Catalyst: triethylamine (TEA)
M$_n$ and PDI: Molecular weight and polydispersity obtained by gel permeation chromatography (GPC) with tetrahydrofuran (THF) as an eluent calibrated by polystyrene (PSt) standard.

In view of the molecular weight of TEA (about 100), the amount of 5 mM used in the experiment of entry 3-5 in Table 2 corresponds to about 0.06% by weight in the MMA monomer solution. This amount is about one hundred and fiftieth (about 1/150) in comparison with the amount of the catalyst (8.9% by weight) used in the experimental example described in Non-Patent Document 1 which is described later. As described above, the living radical polymerization reaction can be conducted with a quite small amount of the catalyst. Therefore, it was confirmed that the activity of the catalyst is very high.

Example 4

Polymerization of Methyl Methacrylate (MMA) Using TBA (Entry 4-1)

In place of TDAE, 20 mM of tributylamine (TBA; the chemical structural formula is as described above) was used. Polymerization of methyl methacrylate (MMA) was carried out in the same manner as in Example 1 except that the reaction materials and reaction conditions were changed as shown in entry 4-1 in Table 3. The results are shown in Table 3.

(Entry 4-2 to Entry 4-3)

Polymerization of methyl methacrylate (MMA) was carried out in the same manner as in the entry 4-1 except that the reaction materials and reaction conditions were changed as shown in entry 4-2 and entry 4-3 in Table 3. The results are shown in Table 3.

Figure 3A:
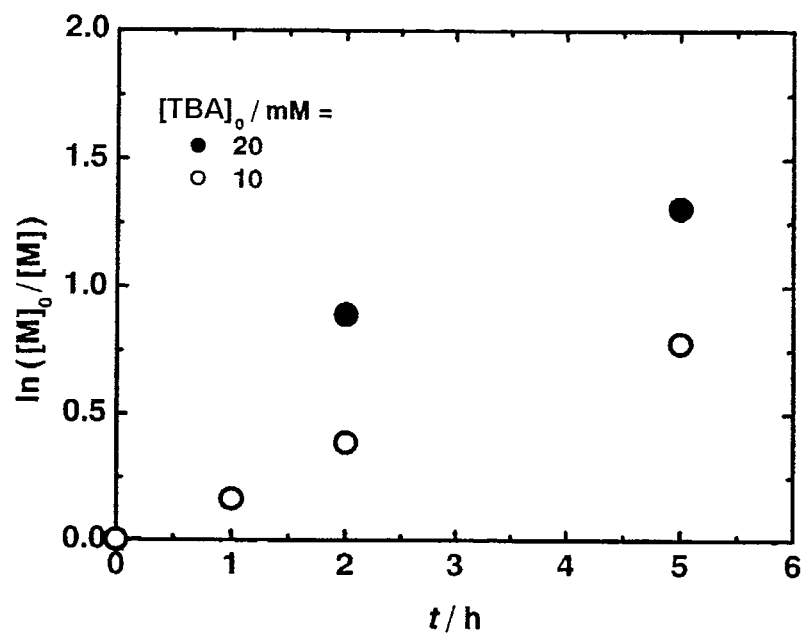
FIG. 3a shows a graph plotting $\ln([M]_0/[M])$ versus t (hour) for the results of performing at 90° C. the polymerization of methyl methacrylate (MMA) containing CP-I (80 mM), TBA (10 mM or 20 mM), and $I_2$ (5 mM). White circles represent the values of TBA 10 mM. Black circles represent the values of TBA 20 mM.
Figure 3B:
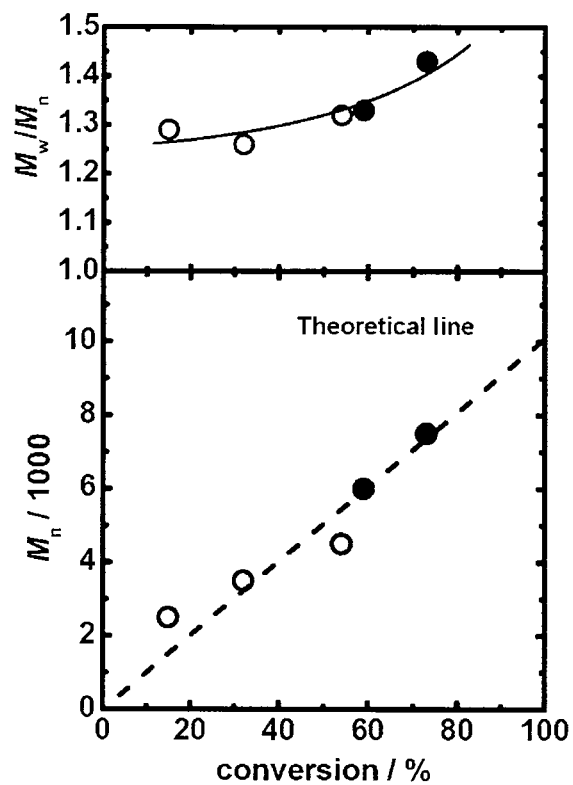
FIG. 3b shows a graph plotting $M_n$ and $M_w/M_n$ versus Conversion (polymerization ratio) for the results of performing at 90° C. the polymerization of methyl methacrylate (MMA) containing CP-I (80 mM), TBA (10 mM or 20 mM), and $I_2$ (5 mM). White circles represent the values of TBA 10 mM. Black circles represent the values of TBA 20 mM. The obtained results are consistent with the theoretical values, which are indicated as Theoretical line. $M_n$ is well consistent with the theoretical value at any concentration of TBA.
Figure 4:
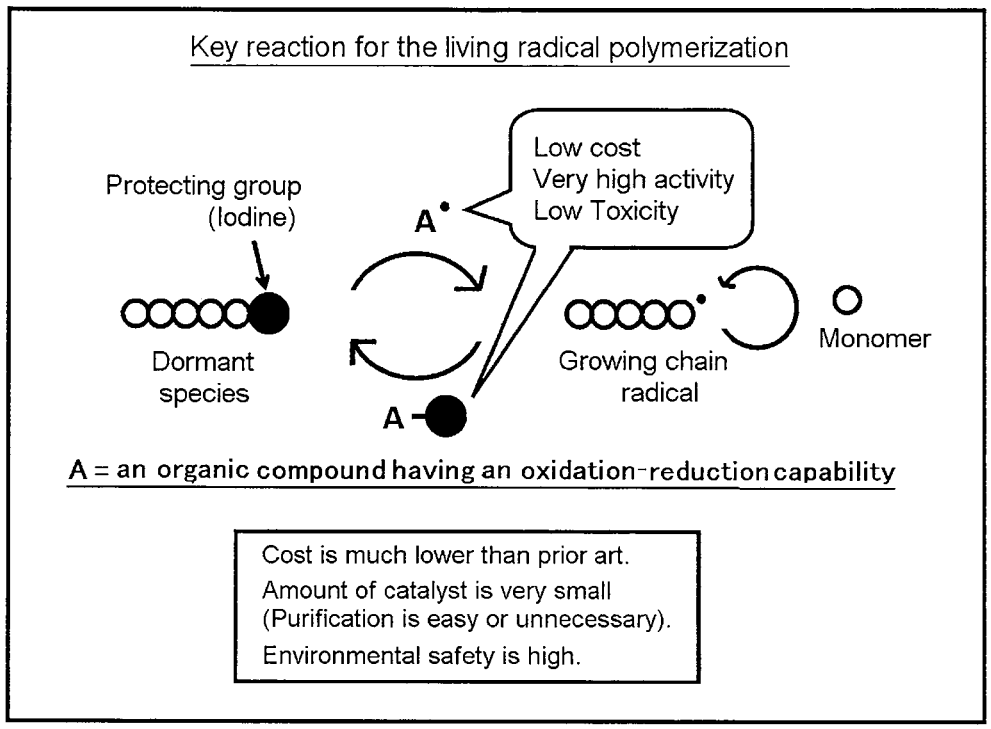
FIG. 4 is a scheme showing the concept of the present invention, and shows the key reaction for the living radical polymerization of the present invention. In this scheme, the organic compound which is the catalyst is indicated by A, and a compound in which iodine is bound to the organic compound is indicated by a symbol of A bound to a black circle. This catalyst is characterized in that it does not require a radical initiator; the catalyst is more inexpensive by several orders of magnitude as compared with transition metal catalysts and the like of prior art; since the catalyst is ultra-highly active, the catalyst can be used in an extremely small amount; purification is unnecessary at the time of production of the catalyst, or even if purification is needed, the purification is easy; and since the catalyst is low in toxicity or non-toxic, the catalyst is highly safe to the human body and the environment.

The polymerization results of entry 4-2 and entry 4-3 are shown in FIG. 3. M$_n$ was approximately in proportion to the conversion ratio, and PDI was low from the early stage of the polymerization. The polymerization was successfully controlled.

TABLE 3

| entry | monomer (equivalents to [R-I]) | catalyst | R-X | [M]$_0$/[R-X]$_0$/[cat]$_0$/[I$_2$](mM) | T (° C.) | t (h) | conv (%) | M$_n$ (M$_{n,theo}$) | PDI |
|---|---|---|---|---|---|---|---|---|---|
| 4-1 | MMA (100) Bulk | TBA | CP-I | 8000/80/20/3 | 90 | 2 | 63 | 7800 (6300) | 1.38 |
| 4-2 | MMA (100) Bulk | TBA | CP-I | 8000/80/20/5 | 90 | 2 | 59 | 6000 (5900) | 1.33 |
| | | | | | | 5 | 73 | 7500 (7300) | 1.43 |

TABLE 3-continued

| entry | monomer (equivalents to [R-I]) | catalyst | R-X | $[M]_0/[R-X]_0/[cat]_0/[I_2]$ (mM) | T (°C.) | t (h) | conv (%) | $M_n$ ($M_{n,theo}$) | PDI |
|---|---|---|---|---|---|---|---|---|---|
| 4-3 | MMA (100) Bulk | TBA | CP-I | 8000/80/10/5 | 90 | 1 | 15 | 2500 (1500) | 1.29 |
|  |  |  |  |  |  | 2 | 32 | 3500 (3200) | 1.26 |
|  |  |  |  |  |  | 5 | 54 | 4500 (5400) | 1.32 |

Monomer: methyl methacrylate (MMA)
Monomer concentration: 8M (bulk), 4M (50% toluene solution)
Alkyl halide to be used as a dormant species (R-I): 2-cyanopropyl iodide (CP-I)
A radical initiator (In) was not used.
Catalyst: tributylamine (TBA)
$M_n$ and PDI: Molecular weight and polydispersity obtained by gel permeation chromatography (GPC) with tetrahydrofuran (THF) as an eluent calibrated by polystyrene (PSt) standard.

Example 5

Polymerization of Benzyl Methacrylate (BzMA) Using TEA (Entry 5-1)

In place of TDAE, 40 mM of triethylamine (TEA; the chemical structural formula is as described above) was used. Further, benzyl methacrylate (BzMA) was used as a monomer. Polymerization of benzyl methacrylate (BzMA) was carried out in the same manner as in Example 1 except that the reaction materials and reaction conditions were changed as shown in entry 5-1 in Table 4. The results are shown in Table 4.

(Entry 5-2 to Entry 5-4)

Polymerization of benzyl methacrylate (BzMA) was carried out in the same manner as in entry 5-1 except that the reaction materials and reaction conditions were changed as shown in entry 5-2 to entry 5-4 in Table 4 and Table 5. The results are shown in Table 4 and Table 5.

TABLE 4

| entry | monomer (equivalents to [R-I]) | catalyst | R-X | $[M]_0/[R-X]_0/[cat]_0/[I_2]$ (mM) | T (°C.) | t (h) | conv (%) | $M_n$ ($M_{n,theo}$) | PDI |
|---|---|---|---|---|---|---|---|---|---|
| 5-1 | BzMA (100) Bulk | TEA | CP-I | 8000/80/40/3 | 80 | 1 | 18.7 | 5920 (3300) | 1.47 |
|  |  |  |  |  |  | 2 | 46.7 | 8840 (8210) | 1.42 |
|  |  |  |  |  |  | 3 | 63 | 11300 (11100) | 1.39 |
|  |  |  |  |  |  | 5 | 75.4 | 13900 (13300) | 1.43 |
| 5-2 | BzMA (100) Bulk | TEA | CP-I | 8000/80/40/10 | 80 | 3 | 15.9 | 3390 (2800) | 1.18 |
|  |  |  |  |  |  | 5 | 22.9 | 4380 (4030) | 1.22 |

TABLE 5

| entry | monomer (equivalents to [R-I]) | catalyst | R-X | $[M]_0/[R-X]_0/[cat]_0/[I_2]$ (mM) | T (°C.) | t (h) | conv (%) | $M_n$ ($M_{n,theo}$) | PDI |
|---|---|---|---|---|---|---|---|---|---|
| 5-3 | BzMA (100) Bulk | TEA | CP-I | 8000/80/120/5 | 80 | 1 | 21.1 | 4960 (3710) | 1.3 |
|  |  |  |  |  |  | 2 | 48 | 9240 (8450) | 1.23 |
|  |  |  |  |  |  | 3 | 64.5 | 12100 (11400) | 1.26 |
|  |  |  |  |  |  | 5 | 60.7 | 11200 (10700) | 1.28 |
| 5-4 | BzMA (100) Bulk | TEA | CP-I | 8000/80/40/5 | 80 | 1 | 10.1 | 3230 (1780) | 1.28 |
|  |  |  |  |  |  | 2 | 27 | 5260 (4760) | 1.29 |
|  |  |  |  |  |  | 3 | 40.7 | 7200 (7170) | 1.28 |

TABLE 5-continued

| entry | monomer (equivalents to [R-I]) | catalyst | R-X | [M]$_0$/[R-X]$_0$/ [cat]$_0$/[I$_2$](mM) | T (° C.) | t (h) | conv (%) | M$_n$ (M$_{n,theo}$) | PDI |
|---|---|---|---|---|---|---|---|---|---|
|  |  |  |  |  |  | 5 | 54.6 | 9120 (9620) | 1.28 |

Monomer: benzyl methacrylate (BzMA)
Monomer concentration: 8M (bulk)
Alkyl halide to be used as a dormant species (R-I): 2-cyanopropyl iodide (CP-I)
A radical initiator (In) was not used.
Catalyst: triethylamine (TEA)
M$_n$ and PDI: Molecular weight and polydispersity obtained by gel permeation chromatography (GPC) with tetrahydrofuran (THF) as an eluent calibrated by polystyrene (PSt) standard.

Example 6

Polymerization of Styrene (St)

Polymerization was carried out in the same manner as in Example 1 except that the reaction materials and reaction conditions were changed as shown in the following tables. The results are shown in Tables 6A and 6B.

TABLE 6A

| entry | monomer | R-X | catalyst | [R-X]0/[cat]0/[I2]0 (mM) | T (° C.) | t (h) |
|---|---|---|---|---|---|---|
| 1 | St | CPI | Bu3P | 80/80/0 | 100 | 2.5 |
| 2 | St | CPI | TDME | 80/40/2 | 120 | 6 |
| 3 | St | CPI | TDME | 80/40/20 | 120 | 16 |
| 4 | St | CPI | TTF/VR110 | 80/(40/80)/0 | 120 | 6 |
| 5 | St | CPI | BTTF/VR110 | 80/(40/80)/0 | 120 | 6 |
| 6 | St | CPI | TDME/VR110 | 80/(40/80)/0 | 120 | 1 |
| 7 | St | PEBr | TDME | 80/160/0 | 120 | 6 |
| 8 | St | PEBr | Bu3N | 80/160/0 | 120 | 6 |
| 9 | St | PEBr | Bu3P | 80/160/0 | 120 | 6 |
| 10 | St |  | TDME | 0/40/0 | 120 | 1 |
| 11 | St |  | TDAE | 0/40/0 | 120 | 1 |
| C-1 | St |  |  | 0/0/0 | 120 | 1 |

Monomer concentration was 8M (bulk polymerization).
M$_n$ and PDI: Molecular weight and polydispersity obtained by gel permeation chromatography (GPC) with tetrahydrofuran (THF) as an eluent calibrated by polystyrene (PSt) standard.
VR110 = 2,2'-azobis (2,4,4-trimethylpentane)

TABLE 6B

| entry | T (° C.) | t (h) | conv (%) | Mn | Mn, theo | PDI |
|---|---|---|---|---|---|---|
| 1 | 100 | 2.5 | 11 | 3800 | 1100 | 1.36 |
| 2 | 120 | 6 | 60 | 9900 | 6000 | 1.49 |
| 3 | 120 | 16 | 74 | 10000 | 7400 | 1.45 |
| 4 | 120 | 6 | 47 | 3400 | 4700 | 1.52 |
| 5 | 120 | 6 | 49 | 4000 | 4900 | 1.35 |
| 6 | 120 | 1 | 79 | 9500 | 7900 | 1.34 |
| 7 | 120 | 6 | 29 | 110600 | 2900 | 1.6 |
| 8 | 120 | 6 | 30 | 1119900 | 3000 | 1.6 |
| 9 | 120 | 6 | 16 | 132300 | 1600 | 1.6 |
| 10 | 120 | 1 | 4 | 146500 |  | 1.6 |
| 11 | 120 | 1 | 10 | 226300 |  | 1.6 |
| C-1 | 120 | 1 | 4 | 113000 |  | 2.4 |

Example 7

Polymerization of Acrylonitrile (AN)

Polymerization was carried out in the same manner as in Example 1 except that the reaction materials and reaction conditions were changed as shown in the following tables. The results are shown in the following tables.

TABLE 7A

| entry | monomer | R—X | catalyst | [R—X]0/[cat]0/[I2]0 (mM) |
|---|---|---|---|---|
| 1 | AN | CPI | TDME | 40/20/5 |
| 2 | AN | CPI | TMEDA | 40/20/2.5 |

TABLE 7B

| entry | T (° C.) | t (min) | conv (%) | Mn | Mn, theo | PDI |
|---|---|---|---|---|---|---|
| 1 | 75 | 1 | 24 | 9700 | 1300 | 1.35 |
|  |  | 4 | 100 | 14900 | 5300 | 1.49 |
| 2 | 75 | 2 | 100 | 2000 | 5300 | 1.47 |

All polymerizations were solution polymerizations (containing 50% of solvent (ethylene carbonate)) (The monomer concentration was 4M due to the presence of 50% of the solvent.) M$_n$ and PDI: Molecular weight and polydispersity obtained by gel permeation chromatography (GPC) with dimethylformamide (DMF) as an eluent calibrated by polymethyl methacrylate (PMMA) standard.

Example 8

Polymerization of n-Butyl Acrylate (BA)

Polymerization was carried out in the same manner as in Example 1 except that the reaction materials and reaction conditions were changed as shown in the following tables. The results are shown in the following tables.

TABLE 8A

| entry | monomer | R—X | catalyst | [R—X]0/[cat]0/ [I2]0 (mM) |
|---|---|---|---|---|
| 1 | BA | CPI | TBP | 80/40/2 |
| 2 | BA | CPI | BPB/TBP | 80/(2/40)/0 |
| 3 | BA | CPI | BPB/TBP | 80/(5/40)/0 |
| 4 | BA | CPI | BPB/VR110/TBP | 80/(5/1/40)/0 |
| 5 | BA | CPI | BPB/DAP/TBP | 80/(5/5/40)/0 |
| 6 | BA | CPI | Ph3P | 80/160/0 |
| 7 | BA | CPI | Ph3P | 80/160/2 |
| 8 | BA | EBiBr | 1,2-bis(diphenylphosphino)methane | 80/80/0 |
| 9 | BA | EBiBr | EDA | 80/80/0 |
| 10 | BA | EBiBr | tris(2-aminoethyl)amine | 80/80/0 |
| 11 | BA | EBiBr | tris(2-aminoethyl)amine | 40/40/0 1-propanol 50 wt % |
| 12 | BA | EBiBr | TDAE | 80/80/0 |

TABLE 8A-continued

| entry | monomer | R—X | catalyst | [R—X]0/[cat]0/[I2]0 (mM) |
|---|---|---|---|---|
| 13 | BA | EBiBr | TDAE | 40/40/0 MEDG50 wt % |

The monomer concentration was 8M in the cases of bulk polymerization and 4M in the cases where solvent was 50%.
$M_n$ and PDI: Molecular weight and polydispersity determined by multi-angle laser light scattering (MALLS) detector with gel permeation chromatography (GPC) with tetrahydrofuran (THF) as an eluent.
BPB = t-butyl peroxybenzoate
TBP = tributylphosphine (Bu3P)
DAP = diamylperoxide
VR110 = 2,2'-azobis(2,4-trimethylpentane)

TABLE 8B

| entry | T (° C.) | t (h) | conv (%) | Mn | Mn, theo | PDI |
|---|---|---|---|---|---|---|
| 1 | 120 | 5 | 20 | 5100 | 2600 | 1.22 |
| 2 | 120 | 1 | 23 | 4600 | 2900 | 1.36 |
|   |   | 6 | 44 | 5900 | 5700 | 1.33 |
| 3 |   | 1 | 17 | 4100 | 2100 | 1.39 |
|   |   |   | 32 | 5100 | 4000 | 1.34 |
|   |   |   | 41 | 6600 | 5100 | 1.22 |
| 4 | 120 | 1 | 11 | 3600 | 1400 | 1.35 |
|   |   | 6 | 29 | 4800 | 3700 | 1.29 |
|   |   | 24 | 44 | 7100 | 5600 | 1.19 |
| 5 | 120 | 2 | 20 | 4100 | 2500 | 1.42 |
|   |   | 6 | 39 | 5200 | 5000 | 1.32 |
|   |   | 24 | 45 | 6000 | 12600 | 1.26 |
| 6 | 80 | 1 | 12 | 5100 | 1600 | 1.35 |
|   |   | 6 | 16 | 4600 | 2000 | 1.43 |
| 7 | 120 | 6 | 17 | 4300 | 2200 | 1.2 |
| 8 | 90 | 4 | 17 | 206000 | 2200 | 1.6 |
| 9 | 90 | 4 | 14 | 179500 | 1700 | 1.6 |
| 10 | 90 | 4 | 60 | 84900 | 7700 | 1.59 |
| 11 | 120 | 4 | 92 | 61300 | 11700 | 1.92 |
| 12 | 90 | 4 | 55 | 12200 | 7000 | 1.77 |
| 13 | 120 | 2 | 41 | 30200 | 5200 | 1.92 |
|   |   | 5 | 56 | 28300 | 7100 | 1.99 |

Example 9

Polymerization of Methyl Methacrylate (MMA) Using TDAE or DEME as a Catalyst Polymerization was carried out in the same manner as in Example 1 except that the reaction materials and reaction conditions were changed as shown in the following tables. The results are shown in the following tables.

TABLE 9A

| entry | monomer | R—X | catalyst | [R—X]0/[cat]0/[I2]0 (mM) |
|---|---|---|---|---|
| 1 | MMA | CPI | TDAE | 80/60/2 |
| 2 | MMA | CPI | TDME | 80/20/2 |
| 3 | MMA | CPI | TDME | 80/40/10 |
| 4 | MMA | CPI | TDME | 60/30/1.5 toluene 25 wt % |
| 5 | MMA | CPI | TDME | 60/30/7.5 toluene 25 wt % |
| 6 | MMA | CPI | TDME | 53/27/1.3 toluene 33 wt % |
| 7 | MMA | CPI | TDME | 20/20/1 toluene 50 wt % |

TABLE 9B

| entry | T (° C.) | t (h) | conv (%) | Mn | Mn, theo | PDI |
|---|---|---|---|---|---|---|
| 1 | 90 | 2 | 56 | 9100 | 5640 | 1.38 |
| 2 | 90 | 0.5 | 27 | 4000 | 2700 | 1.33 |
|   |   | 0.75 | 29 | 5600 | 2900 | 1.30 |
|   |   | 1 | 49 | 6400 | 4900 | 1.28 |
|   |   | 1.5 | 61 | 7500 | 6100 | 1.33 |
|   |   | 2 | 67 | 8400 | 6700 | 1.34 |
| 3 | 90 | 0.25 | 13 | 2400 | 1300 | 1.17 |
|   |   | 0.5 | 33 | 4400 | 3300 | 1.18 |
|   |   | 0.75 | 46 | 6500 | 4600 | 1.21 |
|   |   | 1 | 63 | 7500 | 6300 | 1.34 |
| 4 | 90 | 0.5 | 23 | 4400 | 2300 | 1.37 |
|   |   | 1 | 46 | 7100 | 4600 | 1.28 |
|   |   | 2 | 74 | 10100 | 7400 | 1.42 |
|   |   | 3 | 94 | 12000 | 9400 | 1.49 |
| 5 | 90 | 0.5 | 25 | 3800 | 2500 | 1.18 |
|   |   | 1 | 48 | 6500 | 4800 | 1.23 |
|   |   | 2 | 72 | 9800 | 7200 | 1.35 |
|   |   | 3 | 91 | 11300 | 9100 | 1.43 |
| 6 | 90 | 0.5 | 21 | 3800 | 2100 | 1.34 |
|   |   | 1 | 43 | 6000 | 4300 | 1.32 |
|   |   | 2 | 72 | 9900 | 7200 | 1.33 |
|   |   | 3 | 92 | 11600 | 9200 | 1.40 |
| 7 | 90 | 0.5 | 16 | 3700 | 1600 | 1.34 |
|   |   | 1 | 32 | 4900 | 3200 | 1.35 |
|   |   | 2 | 60 | 7600 | 6000 | 1.34 |
|   |   | 3 | 78 | 9700 | 7800 | 1.34 |
|   |   | 5 | 86 | 11500 | 8600 | 1.39 |

TABLE 9C

| entry | monomer | R—X | catalyst | [R—X]0/[cat]0/[I2]0 (mM) |
|---|---|---|---|---|
| 8 | MMA | CPI | tris(2-(methylamino)ethyl)amine | 80/20/20 |
| 9 | MMA | CPI | DMEDA | 80/20/10 |
| 10 | MMA | CPI | tetramethyl diaminomethane | 80/40/2 |
| 11 | MMA | CPI | tetramethyl diaminomethane | 80/40/5 |
| 12 | MMA | CPI | tetramethyl diaminomethane | 80/40/10 |
| 13 | MMA | CPI | TMEDA | 80/40/0 |
| 14 | MMA | CPI | TMEDA | 80/40/2 |
| 15 | MMA | CPI | TMEDA | 80/40/5 |
| 16 | MMA | CPI | TMEDA | 80/40/10 |
| 17 | MMA | CPI | TBP | 80/40/2 |

TABLE 9D

| entry | T (° C.) | t (h) | conv (%) | Mn | Mn, theo | PDI |
|---|---|---|---|---|---|---|
| 8 | 90 | 1 | 12 | 1700 | 1200 | 1.28 |
|   |   | 2 | 25 | 2700 | 2500 | 1.32 |
|   |   | 5 | 42 | 4200 | 4200 | 1.49 |
| 9 | 90 | 1 | 11 | 1700 | 1100 | 1.27 |
|   |   | 2 | 20 | 2400 | 2000 | 1.29 |
|   |   | 5 | 32 | 3700 | 3200 | 1.46 |
| 10 | 90 | 1 | 44 | 3500 | 4400 | 1.31 |
|   |   | 2 | 63 | 5700 | 6300 | 1.35 |
|   |   | 3 | 74 | 6800 | 7400 | 1.40 |
| 11 | 90 | 0.5 | 28 | 3200 | 2800 | 1.13 |
|   |   | 1 | 42 | 4400 | 4200 | 1.29 |
|   |   | 2 | 61 | 6500 | 6100 | 1.27 |
| 12 | 90 | 0.5 | 18 | 2600 | 1800 | 1.13 |
|   |   | 1 | 34 | 4300 | 3400 | 1.15 |
|   |   | 2 | 47 | 6100 | 4700 | 1.26 |
|   |   | 5 | 63 | 6600 | 6300 | 1.47 |
| 13 | 90 | 1 | 38 | 4600 | 3800 | 1.45 |
|   |   | 2 | 69 | 7500 | 6900 | 1.31 |

TABLE 9D-continued

| entry | T (° C.) | t (h) | conv (%) | Mn | Mn, theo | PDI |
|---|---|---|---|---|---|---|
| 14 | 90 | 1 | 47 | 5000 | 4700 | 1.21 |
|  |  | 2 | 62 | 7000 | 6200 | 1.26 |
|  |  | 3 | 70 | 7200 | 7000 | 1.34 |
| 15 | 90 | 0.5 | 19 | 2300 | 1900 | 1.14 |
|  |  | 1 | 38 | 3400 | 3800 | 1.25 |
|  |  | 2 | 45 | 4700 | 4500 | 1.29 |
|  |  | 5 | 57 | 4900 | 5700 | 1.44 |
| 16 | 90 | 0.5 | 13 | 1900 | 1300 | 1.11 |
|  |  | 1 | 26 | 3200 | 2600 | 1.13 |
|  |  | 2 | 39 | 4100 | 3900 | 1.21 |
|  |  | 5 | 46 | 4500 | 4600 | 1.35 |
| 17 | 90 | 1 | 44 | 4700 | 4400 | 1.13 |

TABLE 9E

| entry | monomer | R—X | catalyst | [R—X]0/[cat]0/[I2]0 (mM) |
|---|---|---|---|---|
| 18 | MMA | EBiBr | TDAE | 40/40/0 MFDG 50 wt % |
| 19 | MMA | EBiBr | tris(2-aminoethyl)amine | 40/40/0 1-propanol 50 wt % |
| 20 | MMA | EBiBr | tris(2-aminoethyl)amine | 40/40/0 MFDG 50 wt % |
| 21 | MMA | EBiBr | EDA/tris(2-aminoethyl)amine | 60/(60/60)/3 MFDG 25 w % |
| 22 | MMA | EBiBr | TMEDA/tris(2-aminoethyl)amine | 60/(60/60)/3 MFDG 25 w % |
| 23 | MMA | EBiBr | Ph3P/tris(2-aminoethyl)amine | 60/(60/60)/3 MFDG 25 w % |
| 24 | MMA | EBiBr | Ph3P/TDAE | 60/(60/60)/3 MFDG 25 w % |

TABLE 9F

| entry | T (° C.) | t (h) | conv (%) | Mn | Mn. theo | PDI |
|---|---|---|---|---|---|---|
| 18 | 90 | 5 | 25 | 114900 | 2500 | 1.65 |
| 19 | 90 | 24 | 34 | 119000 | 3400 | 1.64 |
| 20 | 90 | 24 | 21 | 75400 | 2100 | 1.98 |
| 21 | 90 | 6.5 | 48 | 106400 | 4800 | 1.71 |
| 22 | 90 | 3.67 | 54 | 116300 | 5400 | 1.59 |
| 23 | 90 | 6 | 55 | 92900 | 5500 | 1.73 |
| 24 | 90 | 24 | 43 | 143400 | 4300 | 1.59 |

The monomer concentration was 8M in the case of the bulk polymerization, 6M in the case where solvent was 25%, and 4M in the case where solvent was 50%.
dipropyleneglycolmonomethylether (MFDG)

$M_n$ and PDI: Molecular weight and polydispersity obtained by gel permeation chromatography (GPC) with tetrahydrofuran (THF) as an eluent calibrated by polymethyl methacrylate (PMMA) standard.

Example 10

Polymerization of Benzyl Methacrylate (BzMA)

Polymerization was carried out in the same manner as in Example 5 except that the reaction materials and reaction conditions were changed as shown in the following tables. The results are shown in the following tables.

TABLE 10A

| entry | monomer | R—X | catalyst | [R—X]0/[cat]0/[I2]0 (mM) |
|---|---|---|---|---|
| 1 | BzMA | CPI | TDME | 40/20/1 toluene 50 wt % |
| 2 | BzMA | CPI | TDME | 80/40/5 |
| 3 | BzMA | CPI | TMEDA | 80/40/5 |
| 4 | BzMA | CPI | TBA | 80/40/20 |
| 5 | BzMA | CPI | TMEDA | 80/80/10 |

TABLE 10B

| entry | T (° C.) | t (h) | conv (%) | Mn | Mn. theo | PDI |
|---|---|---|---|---|---|---|
| 1 | 90 | 0.5 | 15 | 6200 | 2610 | 1.34 |
|  |  | 1 | 31 | 7600 | 5480 | 1.30 |
|  |  | 2 | 58 | 9400 | 10100 | 1.29 |
|  |  | 5 | 87 | 11800 | 15300 | 1.31 |
| 2 | 90 | 0.25 | 28 | 7200 | 4990 | 1.23 |
|  |  | 0.5 | 55 | 10000 | 9680 | 1.26 |
|  |  | 0.75 | 72 | 11800 | 12500 | 1.31 |
|  |  | 1 | 84 | 13400 | 14800 | 1.35 |
|  |  | 2 | 95 | 14400 | 16700 | 1.37 |
| 3 | 90 | 2 | 53 | 8500 | 9340 | 1.15 |
|  |  | 6 | 61 | 9300 | 10700 | 1.24 |
| 4 | 90 | 2 | 60 | 9800 | 10600 | 1.22 |
|  |  | 6 | 67 | 11100 | 11900 | 1.32 |
| 5 | 90 | 0.5 | 24 | 5000 | 4480 | 1.07 |
|  |  | 1 | 50 | 7900 | 8780 | 1.13 |
|  |  | 1.5 | 64 | 9800 | 11200 | 1.20 |
|  |  | 2 | 67 | 10700 | 11800 | 1.28 |

The monomer concentration was 8M in the case of the bulk polymerization, and 4M in the case where solvent was 50%.
$M_n$ and PDI: Molecular weight and polydispersity determined by multi-angle laser light scattering (MALLS) detector with gel permeation chromatography (GPC) with tetrahydrofuran (THF) as an eluent.

Example 11

Polymerization of Polyethyleneglycol Methacrylate (PEGMA)

Polymerization was carried out in the same manner as in Example 1 except that the reaction materials and reaction conditions were changed as shown in the following tables. The results are shown in the following tables.

TABLE 11A

| entry | monomer | R—X | catalyst | [R—X]0/[cat]0/[I2]0 (mM) |
|---|---|---|---|---|
| 1 | PEGMA (n = 9) | CPI | TBA | 80/40/5 |
| 2 | PEGMA (n = 9) | CPI | TMEDA | 80/40/5 |

TABLE 11B

| entry | T (° C.) | t (h) | conv (%) | Mn | Mn, theo | PDI |
|---|---|---|---|---|---|---|
| 1 | 80 | 2 | 53 | 14100 | 24900 | 1.3 |
| 2 | 80 | 2 | 27 | 9000 | 12800 | 1.14 |
|  |  | 6 | 34 | 10600 | 16000 | 1.15 |

The monomer concentration was 8M (bulk polymerization).
The molecular weight of the monomer was 475.
$M_n$ and PDI: Molecular weight and polydispersity determined by multi-angle laser light scattering (MALLS) detector with gel permeation chromatography (GPC) with dimethylformamide (DMF) as an eluent.

Example 12

Polymerization of 2-Ethylhexyl Methacrylate (EHMA)

Polymerization was carried out in the same manner as in Example 1 except that the reaction materials and reaction conditions were changed as shown in the following tables. The results are shown in the following tables.

TABLE 12A

| entry | monomer | R—X | catalyst | [R—X]0/[cat]0/[I2]0 (mM) |
|---|---|---|---|---|
| 1 | EHMA | EBiBr | TDAE | 80/20/0 |

TABLE 12B

| entry | T (° C.) | t (h) | conv (%) | Mn | Mn, theo | PDI |
|---|---|---|---|---|---|---|
| 1 | 120 | 0.25 | 88 | 108000 | 17500 | 1.84 |

Monomer concentration was 8M (bulk polymerization).
$M_n$ and PDI: Molecular weight and polydispersity obtained by gel permeation chromatography (GPC) with tetrahydrofuran (THF) as an eluent calibrated by polymethyl methacrylate (PMMA) standard.

Example 13

Random Copolymerization of 2-Hydroxyethyl Methacrylate (HEMA) and Methyl Methacrylate (MMA)

Polymerization was carried out in the same manner as in Example 1 except that the reaction materials and reaction conditions were changed as shown in the following tables. The results are shown in the following tables.

TABLE 13A

| entry | monomer | R—X | catalyst | [R—X]0/[cat]0/[I2]0 (mM) |
|---|---|---|---|---|
| 1 | HEMA/MMA (1000/7000) | CPI | TMEDA | 80/40/5 |

TABLE 13B

| entry | T (° C.) | t (h) | conv (%) | Mn | Mn, theo | PDI |
|---|---|---|---|---|---|---|
| 1 | 80 | 2 | 53.4 | 9700 | 5600 | 1.28 |

Random copolymerization of MMA and HEMA
Monomer concentration was 8M (bulk polymerization)
$M_n$ and PDI: Molecular weight and polydispersity obtained by gel permeation chromatography (GPC) with dimethylformamide (DMF) as an eluent calibrated by polymethyl methacrylate (PMMA) standard.

Example 14

Polymerization of 2-Hydroxyethyl Methacrylate (HEMA)

Polymerization was carried out in the same manner as in Example 1 except that the reaction materials and reaction conditions were changed as shown in the following tables. The results are shown in the following tables.

TABLE 14A

| entry | monomer | R—X | catalyst | [R—X]0/[cat]0/[I2]0 (mM) |
|---|---|---|---|---|
| 1 | HEMA | CPI | TDME | 40/20/10 MFDG 50 wt % |

TABLE 14B

| entry | T (° C.) | t (h) | conv (%) | Mn | Mn, theo | PDI |
|---|---|---|---|---|---|---|
| 1 | 80 | 2 | 26.5 | 9900 | 3400 | 1.35 |

The monomer concentration was 4M (solution polymerization).
dipropylene glycolmonomethylether (MFDG)
$M_n$ and PDI: Molecular weight and polydispersity determined by multi-angle laser light scattering (MALLS) detector with gel permeation chromatography (GPC) with dimethylformamide (DMF) as an eluent.

Example 15

Polymerization of Glycidyl Methacrylate (GMA)

Polymerization was carried out in the same manner as in Example 1 except that the reaction materials and reaction conditions were changed as shown in the following tables. The results are shown in the following tables.

TABLE 15A

| entry | monomer | R—X | catalyst | [R—X]0/[cat]0/[I2]0 (mM) |
|---|---|---|---|---|
| 1 | GMA | CPI | TMEDA | 80/40/40 |

TABLE 15B

| entry | T (° C.) | t (h) | conv (%) | Mn | Mn, theo | PDI |
|---|---|---|---|---|---|---|
| 1 | 90 | 2 | 35 | 5300 | 5000 | 1.45 |

The monomer concentration was 8M (bulk polymerization).
$M_n$ and PDI: Molecular weight and polydispersity determined by multi-angle laser light scattering (MALLS) detector with gel permeation chromatography (GPC) with tetrahydrofuran (THF) as an eluent.

Example 16

Block Copolymerization of Methyl Methacrylate (MMA) (First Block) and Benzyl Methacrylate (BzMA) (Second Block)

Polymerization was carried out in the same manner as in Example 1 except that the reaction materials and reaction conditions were changed as shown in the following tables. The results are shown in the following tables.

TABLE 16A

| entry | monomer | R—X | catalyst | [R—X]0/[cat]0/[I2]0 (mM) |
|---|---|---|---|---|
| 1 | MMA | PMMA-I | TDME | 40/20/10 toluene 50 wt % |

TABLE 16B

| entry | T (° C.) | t (h) | conv (%) | Mn | Mn, theo | PDI |
|---|---|---|---|---|---|---|
| 1 | 90 | 1.5 | 60 | 11000 | 14200 | 1.35 |

The monomer concentration was 4M (solution polymerization).
Regarding the poly(methyl methacrylate)-iodine adduct (PMMA-I), Mn = 3600, PDI = 1.20.
$M_n$ and PDI: Molecular weight and polydispersity obtained by gel permeation chromatography (GPC) with tetrahydrofuran (THF) as an eluent calibrated by polymethyl methacrylate (PMMA) standard.

Example 17

Block Copolymerization by Successive Addition of Methyl Methacrylate (MMA) and Benzyl Methacrylate (BzMA)

As the first block, the solution polymerization of MMA (4 M) (toluene, 50 vol %) was carried out at 90° C. for 3.5 hours in the presence of CP-I (40 mM), TDME (20 mM), and iodine $I_2$ (10 mM), and consequently the ratio of polymerization was 62%, and poly(methyl methacrylate)-iodine adduct (PMMA-I) ($M_n$=6200 and PDI=1.28) was produced. To this solution (without isolation and purification of PMMA-I), BzMA (in the same equivalent as the amount of MMA initially added), TDME (0.0025 equivalent to BzMA), and iodine $I_2$ (0.00125 equivalent to BzMA) were added, and then the polymerization was performed at 90° C. Consequently, as the second block, the random copolymerization of MMA (a monomer which was not polymerized at the time of the first block) and BzMA occurred to produce PMMA-block-(PMMA-random-PBzMA) having narrow molecular weight distribution. The results are shown in the following table. It should be noted that PBzMA stands for poly (benzyl methacrylate).

TABLE 17A

| entry | first addition monomer | second addition monomer | R—X | catalyst | [R—X]0/[cat]0/[I2]0 (mM) |
|---|---|---|---|---|---|
| 1 | MMA | | CP-I | TDME | 40/20/10 toluene 50 wt % |
| | | BzMA | | TDME | +0/10/5 |

TABLE 17B

| entry | T (° C.) | t (h) | conv (%) | Mn | Mn, theo | PDI |
|---|---|---|---|---|---|---|
| 1 | 90 | 3.5 | 62 | 6200 | 6200 | 1.28 |
| | 90 | +3 | +38 | 14000 | 14400 | 1.48 |

Monomer concentration was 4M (solution polymerization) (the first block).
In the first block, the molar ratio of MMA, CP-I, TDME, and iodine ($I_2$) was 4000:40:20:10. After the reaction of the first block, BzMA was added in the same mole as the initial amount of MMA. The molar ratio of BzMA, TDME, and iodine ($I_2$) added at this time was 4000:10:5.
$M_n$ and PDI: Molecular weight and polydispersity obtained by gel permeation chromatography (GPC) with tetrahydrofuran (THF) as an eluent calibrated by polymethyl methacrylate (PMMA) standard.

Comparative Example 2

Polymerization experiments were performed similarly to Example 1, with the proviso that the following formulations were used:
Monomer: styrene, 8.0 M (1 g);
Alkyl halide: 1-phenylethyl bromide, 80 mM (0.016 g) (This is abbreviated as "PEB" in the following table);
Catalyst: CuBr 5 mM (0.00071 g); and
Ligand: 4,4'-di-(5-nonyl)-2,2'-bipyridine 10 mM (0.0035 g) (This is abbreviated as "dHbipy" in the following table).

A ligand is always required in order to dissolve CuBr (catalyst) in a monomer. In a case of dHbipy, two equivalents are required with respect to CuBr. The concentration of the catalyst in this experiment (CuBr complex concentration) was 5 mM. Please note that no peroxide was used in these experiments, since it is technical common knowledge of those skilled in the art that no peroxide is used in cases of copper complex catalysts. The reasons are as follows: (1) in the cases of copper complex catalysts, the radical reaction is initiated even if a peroxide is not used; and (2) if a peroxide is added to a copper complex catalyst, then an inactivation reaction of the growing species can occur significantly and as a result, the molecular weight distribution becomes broader. Specifically, for example, the aforementioned non-patent document 1 describes that a reaction material which contains no peroxide is used.

These materials were dissolved in a monomer to obtain a reaction solution. The reaction solution was heated to 80° C. The results are as follows.

TABLE 6

Result of polymerization with a copper complex

| No. | XA | [PEB]0/[CuBr/2dHbipy]0 (mM) | T (° C.) | t (h) | conv (%) | $M_n$ | PDI |
|---|---|---|---|---|---|---|---|
| 1 | CuBr | 80/5 | 80 | 2 | 1.8 | 1200 | 1.40 |
| | | | | 4 | 3.5 | 1300 | 1.40 |
| | | | | 8 | 6.0 | 1400 | 1.38 |

PEB: 1-phenylethyl bromide
dHbipy: a ligand for dissolving CuBr into a monomer (styrene)

As a result, the monomer conversion was much lower than those of MMA in Example 1. Further, the values of $M_n$ after the reaction were 1200 to 1400, which are significantly low. Polystyrene having high molecular weight was not obtained. Furthermore, the values of $M_w/M_n$ (PDI) were much larger than the values in the experiments of Example 1 which uses the catalyst of the present invention. Therefore, it is understood that the activity of the transition metal catalyst is significantly inferior than the activity of the catalyst of the present invention.

As can be seen from the comparison of the result of Comparative Example 2 and the results of Example 1, the catalyst of the present invention has a significantly higher activity than a transition metal complex catalyst used in the prior art.

The aforementioned Examples show that the present invention has superior properties in comparison with the catalysts in the prior art, which is disclosed in the prior art.

For example, according to the Example described in the aforementioned Non-Patent Document 1, the following reaction solution is subjected to a reaction:
styrene: 8.7 M (1 g);
1-phenylethyl bromide: 87 mM (0.016 g);
CuBr: 87 mM (0.013 g); and
4,4'-di-(5-nonyl)-2,2'-bipyridine: 174 mM (0.076 g).

This reaction solution was heated to 110° C. for 7 hours, and a polymer was obtained. 0.089 g of the complex compound was used with respect to 1 g of the monomer. That is, the catalyst was used in a large amount of 8.9 weight % based on the monomer.

In comparison with this example, the present invention can significantly reduce the amount of catalyst used, and can also reduce the reaction temperature by 10 to 40° C., without the need for a ligand.

As described above, the present invention has been illustrated using the preferred embodiments of the present invention. However, the present invention should not be construed to be limited to these embodiments. It is understood that the scope of the present invention should be construed solely on the basis of the claims. It is understood that those skilled in the art can carry out an invention within the scope equivalent to the description of the specification, based on the description of the specific preferred embodiments, the description of the present invention and the common technical knowledge. It is understood that the patents, patent applications, and other documents cited in the present specification should be incorporated by reference in the present specification as if the contents thereof are specifically described herein.

INDUSTRIAL APPLICABILITY

As described above, the inventors obtained an invention of a new living radical polymerization method (a precisely controlled radical polymerization), which uses an organic compound having an oxidation-reduction capability as a catalyst. The method is characterized by the low toxicity of the catalyst, low amount of the catalyst required, high solubility of the catalyst (a ligand is unnecessary), mild reaction conditions, no coloration, no odor (treatment after a polymerization reaction is unnecessary), and the like. The method is significantly more environmental-friendly and economically advantageous than the conventional living radical polymerization methods.

One half or more of the amount of polymer compounds produced in the world is produced by radical polymerizations. A living radical polymerization method can be applied to the production of a variety of high value added material. Specifically, it can be used for production of, for example, thermoplastic elastomer (material for automobiles, industrial articles, medical materials, footwear, sports articles, toys, materials for coating electrical wire, materials for buildings or construction, materials for modifying resins, and the like), materials for resistor, organic electroluminescence material, adhesives, polymer alloy, various filler additives, lubricant, surfactant, paint, ink, packaging material, pharmaceuticals (for example, materials for sustained release medicaments), personal care products (cosmetics, hair dressings, and the like), and the like. The scale of the market is very large. The living radical polymerization of the present invention can be widely used as a satisfactory process for producing new electronic materials, optical materials, separation materials, or materials for a living body.

The biggest problem in the prior art concerning the practical utilization of living radical polymerization has been the high cost of the catalyst. That is, when a living radical polymerization is carried out, the catalyst enters a state in which the catalyst has been incorporated into the resulting polymer, and therefore, it takes time and effort to recover the catalyst from the polymer. This, as a result, increases the process costs enormously, and is not practical. For this reason, it is difficult to practically recover and recycle the catalyst, and under the current situation, the catalyst is substantially used once and thrown away.

The inventors of the present invention discovered that inexpensive an organic compound having an oxidation-reduction capability acts as excellent catalysts in a living radical polymerization, and thus realized living radical polymerization at far lower costs as compared with the conventional techniques. Specifically, when the cost of catalyst required in synthesizing 1 kg of a polymer is calculated based on the prices described in the catalogue of Sigma-Aldrich Company, for example, with copper complex catalyst that is most frequently used as a conventional type catalyst, the cost of catalyst sums approximately to several thousand yen. Further, even if a germanium catalyst is used, the cost sums to about one thousand yen. On the other hand, in the present invention, for example, when trialkylamine is used as a catalyst, the cost sums only to several ten yen, or even to several yen. In other words, according to the present invention, it is possible to reduce the cost significantly, as compared with the conventional catalysts.

Upon considering that the prices of various general-purpose monomers are generally around 100 yen to several hundred yen per kilogram, the cost for catalyst that is about ten times the cost for monomer, was required in the conventional techniques. In this regard, the present invention requires the cost for catalyst that is only about one-tenth or about one-hundredth of the cost for monomer, and thus the cost reducing effect is dramatic.

In addition, the advantages possessed by germanium catalysts, such as low toxicity (or non-toxicity) of catalyst, high dissolubility (no need for ligand), mild reaction conditions, no coloration/no odor (no need for treatment after polymerization reaction), are all possessed by the organic compound which is used as a catalyst of the present invention. Furthermore, a polymerization can be controlled with an amount of catalyst that is far lower (for example, down to one-third) than the small amount of catalyst realized by germanium catalysts. Although germanium catalysts (iodides) are somehow sensitive to moisture and light, the organic compounds which are used as a catalyst in the present invention are resistant to moisture and light, and further facilitate the operation of polymerization. As such, the present invention exhibits high environmental safety which is not possessed by conventional processes, as well as excellent economic efficiency and superior convenience that exceed the conventional techniques by far, and is highly excellent in practicality.

Moreover, the organic compound, which is used as a catalyst of the present invention, has particularly excellent functional-group-tolerance, and accordingly is expected to be utilized for various functional monomers that have a functional group, and have many practical applications.

The invention claimed is:

1. A method of polymerization comprising:
polymerizing, in a living radical polymerization, a monomer of the formula $CH_2=CR^5R^6$, hydrogen or a $C_{1-3}$ alkyl group and $R^6$ is a carbon/late, $C_{1-10}$ aryl or a $C_{6-10}$ aromatic group, by contacting the monomer with an organic halide and an organic compound
wherein:
the organic halide is of the formula $CR^2R^3R^4X^3$, wherein $R^2$ and $R^3$ are each independently hydrogen or $C_{1-10}$, $R^4$ is halogen, hydrogen, $C_{1-10}$ alkyl, a $C_{6-10}$ aromatic group, a $C_{5-10}$ heteroaryl group containing at least one heteroatom or cyano, and $X^3$ is halogen, and
the organic compound is selected from the group consisting of:
triethylamine;
tributylamine;
tetrakis(dimethylamino) amine;
1,4,8,11-tetramethyl-1,4,8,11-tetraazacyclotetradecane;
Tributylphosphine;
N,N,N',N''-pentamethyl diethylenetriamine;
ethylenediamine;
dimethyl ethylenediamine;
tetramethylethylenediamine;

tetramethyldiaminomethane;
tris(2-aminoethyl)amine;
tris(2-(methylamino)ethyl)amine;
1,2-bis(diphenylphosphino)methane;
hematoporphyrin;
triethylphosphine;
triphenylphosphine;
phosphonic acid;
1,2-bis(diphenylphosphino)methane;
thiophene;
oligothiophene;
polythiophene;
tetrathiofulvalene;
bis(ethylenedithio)tetrathiafulvalene;
3,4-ethylenedioxythiophene; and
poly(3,4-ethylenedioxythiophene);
the living radical polymerization is conducted without the use of a catalyst other than the organic compound,
a raw material composition which is used in the method does not include a raw material containing a transition metal, and
a radical initiator is not added to a reaction mixture at the time of conducting the living radical polymerization.

2. The method of claim 1, wherein $R^6$ is a carboxylate or a $C_6$ aromatic group.

3. The method of claim 2, wherein $R^6$ is carboxylate, phenyl or naphthyl.

4. The method of claim 1, wherein $R^2$ is and $R^3$ are each independently hydrogen or $C_{1-5}$ alkyl.

5. The method of claim 1, wherein $R^4$ is halogen, hydrogen, $C_{1-5}$ alkyl, a $C_{6-10}$ aromatic group, a $C_{5-10}$ heteroaryl group containing at least one heteroatom or cyano.

6. The method of claim 1, wherein $R^4$ is a $C_{6-10}$ aromatic group, a $C_{5-10}$ heteroaryl group containing at least one heteroatom or cyano.

7. The method of claim 5, wherein $R^4$ is a $C_{6-10}$ aromatic group, a $C_{5-10}$ heteroaryl group containing at least one heteroatom or cyano.

8. The method of claim 1, wherein $R^5$ is hydrogen or a $C_{1-3}$ alkyl group and $R^6$ is a carboxylate or a $C_6$ aromatic group.

9. The method of claim 1, wherein the monomer is selected from the group consisting of (meth)acrylic acid ester; a styrene monomer; (meth)acrylonitrile; (meth)acrylamide; a vinyl ester monomer; (meth)acrylic acid; and vinyl halide.

10. The method of claim 1, wherein the organic compound is selected from the group consisting of:
triethylamine;
tributylamine;
tetrakisdimethylaminoethene;
1,4,8,11-tetramethyl-1,4,8,11-tetraazacyclotetradecane;
tributylphosphine;
triphenylphosphine;
bis(ethylenedithio)tetrathiafulvalene;
ethylenediamine;
dimethylethylenediamine;
tetramethylethylenediamine;
tetramethyldiaminomethane;
tris(2-aminoethyl)amine;
tris(2-(methylamino)ethyl)amine;
1,2-bis(diphenylphosphino)methane; and
hematoporphyrin.

\* \* \* \* \*